United States Patent [19]
Stork et al.

[11] Patent Number: 5,621,858
[45] Date of Patent: Apr. 15, 1997

[54] NEURAL NETWORK ACOUSTIC AND VISUAL SPEECH RECOGNITION SYSTEM TRAINING METHOD AND APPARATUS

[75] Inventors: David G. Stork, Stanford; Gregory J. Wolff, Mountain View, both of Calif.

[73] Assignees: Ricoh Corporation, Menlo Park, Calif.; Ricoh Company, Ltd., Tokyo, Japan

[21] Appl. No.: 137,318

[22] Filed: Oct. 14, 1993

Related U.S. Application Data

[63] Continuation-in-part of Ser. No. 889,619, May 26, 1992, Pat. No. 5,586,215.

[51] Int. Cl.$^6$ .................................. G01L 5/06; G01L 9/00
[52] U.S. Cl. ...................... 395/2.41; 395/2.39; 382/156
[58] Field of Search ............................. 395/2, 2.41, 2.39; 382/156, 155, 157, 158

[56] References Cited

U.S. PATENT DOCUMENTS

| | | | |
|---|---|---|---|
| 4,620,286 | 10/1986 | Smith et al. | 395/77 |
| 4,757,541 | 7/1988 | Beadles | 381/43 |
| 4,937,872 | 6/1990 | Hopfield et al. | 381/43 |
| 4,975,960 | 12/1990 | Petajan | 381/43 |
| 5,027,406 | 6/1991 | Roberts et al. | 381/43 |
| 5,163,111 | 11/1992 | Baji et al. | 395/22 |
| 5,175,793 | 12/1992 | Sakamoto et al. | 395/2 |

FOREIGN PATENT DOCUMENTS

| | | | |
|---|---|---|---|
| 9100591 | 1/1991 | WIPO | G10L 5/06 |
| 9111802 | 8/1991 | WIPO | G10L 7/08 |

OTHER PUBLICATIONS

Waibel, A., "Modular Construction of Time–Delay Neural Networks for Speech Recognition," Neural Computation, 1, pp. 39–46 (1989).

Petajan, E., et al., "An Improved Automatic Lipreading System to Enhance Speech Recognition," ACM SIG-CHI–88, pp. 19–25 (1988).

Pentland, A., et al., "Lip Reading: Automatic Visual Recognition of Spoken Words," Proc. Image Understanding and Machine Vision, Optical Society of America, pp. 1–9 (Jun. 12–14, 1989).

Yuhas, B. P., et al., "Integration of Acoustic and Visul Speech Signals Using Neural Networks," IEEE *Communications Magazine*, pp. 65–71 (Nov. 1989).

Waibel, A., et al., "Phoneme Recognition: Neural Networks vs. Hidden Markov Models," IEEE ICASSP88 Proceedings, vol. 1, pp. 107–110 (1988).

(List continued on next page.)

*Primary Examiner*—Allen R. MacDonald
*Assistant Examiner*—Richemond Dorvil
*Attorney, Agent, or Firm*—Blakely, Sokoloff, Taylor & Zafman

[57] ABSTRACT

The apparatus for the recognition of speech includes an acoustic preprocessor, a visual preprocessor, and a speech classifier that operates on the acoustic and visual preprocessed data. The acoustic preprocessor comprises a log mel spectrum analyzer that produces an equal mel bandwidth log power spectrum. The visual processor detects the motion of a set of fiducial markers on the speaker's face and extracts a set of normalized distance vectors describing lip and mouth movement. The speech classifier uses a multilevel time-delay neural network operating on the preprocessed acoustic and visual data to form an output probability distribution that indicates the probability of each candidate utterance having been spoken, based on the acoustic and visual data. The training system includes the speech recognition apparatus and a control processor with an associated memory. Noisy acoustic input training data together with visual data is used to generate acoustic and visual feature training vectors for processing by the speech classifier. A control computer adjusts the synaptic weights of the speech classifier based upon the noisy input training data and exemplar output vectors for producing a robustly trained classifier based on the analogous visual counterpart of the Lombard effect.

10 Claims, 16 Drawing Sheets

OTHER PUBLICATIONS

T. J. Sejinowski et al., "Combining Visual and Acoustic Speech Signals with a Neural Network Improves Intelligibility," Advances in Neural Info. Proceeding Systems 2, 8 pgs. (undated).

Neural Net. Lipreading System for improved speech Recognition Stork et al. IEEE 7–11 Jun. 1992.

An Animated display of Tongue, Lip and Jaw movements during speech: Hochberg et al IEEE 1–5 Feb. 1992.

——— training set error      - - - - - testing set error

Input

VO
51%

Input

AO
64%

Input

A x V
91%

Input full AV
87%

NEURAL NETWORK ACOUSTIC AND VISUAL SPEECH RECOGNITION SYSTEM TRAINING METHOD AND APPARATUS

CROSS-REFERENCE TO RELATED APPLICATION

This is a continuation-in-part of a prior application Ser. No. 07/889,619 filed on May 26, 1992 now U.S. Pat. No. 5,586,215, for A Neural Network Acoustic and Visual Speech Recognition System.

BACKGROUND OF THE INVENTION

1. Field of the Invention

The invention pertains to the field of machine speech recognition and, more specifically, to the enhancement of acoustic speech recognition by using machine lip reading in conjunction with acoustic data in a neural network classification system.

2. Background to the Invention

The goal of automatic or machine speech recognition is to design a system that approaches the human ability to understand spoken language amidst variations in speaker accents, gender, speech rate, degree of coarticulation, all in the presence of acoustic distracters and noise. Current automated systems are of lower accuracy and robustness than that which is necessary to fulfill the vast need in such applications as computer speech-to-text conversion, automatic translation and speech based control systems. Representative approaches include hidden Markov models in which transition probabilities are encoded in links between nodes (states) representing phonemic segments, and "blackboard" methods in which multiple special purpose phonological, lexical and grammatical based subsystems are combined to work synergistically to maximize speech recognition score. More recently, neural networks have been applied with some success in limited domains, for example, as described by A. Waibel in an article entitled "Modular Construction of Time-Delay Neural Networks for Speech Recognition," published in Neural Computation 1, 39–46 (1989).

Any predictive source of information and any constraints that could be reasonably incorporated into an artificial system would tend to increase the recognition accuracy and thus be desirable to include in a speech recognition system. Traditionally, most research has focused on the inclusion of high level linguistic information such as grammatical and syntactical data. It is clear that humans can employ information other than the acoustic signal in order to enhance understanding. For example, hearing impaired humans often utilize visual information for "speech reading" in order to improve recognition accuracy. See, for example, Kodd, B. and Campbell, R. (eds.), "Hearing by Eye: The Psychology of Lip-reading," Hillsdale, N.J., Lawrence Erlbaum Press (1987); or DeFilippo, C. L. and Sims, D. G. (eds.), "New Reflections on Speechreading," special issue of The Volta Review 90(5), (1988).

Speech reading can provide direct information about speech segments and phonemes, as well as about rate, speaker gender, and identity, and subtle information for separating speech from background noise. The well-known "cocktail party effect," in which speech corrupted by crowd noise is made significantly more intelligible when the talker's face can be seen, provides strong evidence that humans use visual information in speech recognition.

Several speech reading systems have been described recently including:

a) Petajan, E. D., et al., "An Improved Automatic Lip-reading System to Enhance Speech Recognition," ACM SIGCHI-88, 19–25 (1988);

b) Pentland, A., et al., "Lip Reading: Automatic Visual Recognition of Spoken Words," Proc. Image Understanding and Machine Vision, Optical Society of America, Jun. 12–14 (1984); and c) Yuhas, B. P., et al., "Integration of Acoustic and Visual Speech Signals Using Neural Networks," November, 1989, IEEE Communications Magazine (1989).

Petajan, et al. used threshold images (pixels) of a talker's face during the production of a word together with a dictionary of pre-stored labeled utterances and a standard distance classifier for visual recognition.

Pentland, et al. used an optical flow technique to estimate the velocities of the upper lip, lower lip, and the two corners of the mouth from the raw pixel video image of the mouth. They then used a zero-crossing strategy for classifying three and four digit phrases.

Yuhas, et al. trained a neural network using a static images of the mouth shape for vowel recognition together with a controller with free parameters for adjusting the relative weights of visual and auditory contributions for best recognition in the presence of different levels of acoustic noise.

SUMMARY AND OBJECTS OF THE INVENTION

According to the present invention, a speech recognition system training method is provided wherein acoustical and visual speech signals are both processed so as to enhance the likelihood of a proper classification of the speech utterance.

One object is to improve the performance of speech recognition systems that only use acoustic or visual lip position information particularly in an adverse noisy environment.

Another object is to provide a time delay neural network speech reading system for classifying utterances using only visual data.

Another object is to augment an acoustic speech recognition system by using a time delay neural network visual speech recognition system in conjunction with the acoustic speech recognition system.

Another object is to provide the classifier with a continuous stream of related visual and acoustic data from which the acoustical utterance may be detected and classified.

Another object is to provide an improved training method for improving the accuracy of acoustic and visual speech classifiers in noisy environments.

Another object is to provide a time delay neural network classifier architecture that supports gradient descent or other learning methods such as back propagation training.

Another object is to provide acoustical and visual signal preprocessing prior to the time delay neural network classifier.

Another object is to provide an output classification that is a probability distribution representing the probability of each possible candidate utterance having occurred in a given time interval.

Another object is to provide a simple method for extracting dynamic facial visual information by means of a selected set of facial markers.

A speech recognition system for recognizing utterances belonging to a pre-established set of allowable candidate utterances comprises an acoustic feature extraction apparatus, a dynamic visual feature extraction apparatus, and a neural network classifying apparatus. The acoustic feature extraction apparatus converts acoustic speech signals representative of an utterance into a corresponding spectral feature vector set. The dynamic visual feature extraction apparatus converts the dynamic facial features associated with the generation of the acoustic utterance into a dynamic visual feature vector set. The neural network classifying apparatus converts the dynamic acoustic and visual feature vectors into a conditional probability distribution that describes the probability of each candidate utterance having been spoken given the observed acoustic and visual data.

DETAILED DESCRIPTION

Several embodiments of speech recognition systems are described in which each system is trained to recognize a limited set of speech utterances. The various embodiments differ in the type of information used and/or in the way the information signals are processed. In each case, the object of the speech recognition system is to produce at the classifier output a probability distribution associated with each of the possible candidate utterances.

For the sake of clarity in the following description, specific examples of the invention embodiments for use in recognizing one out of ten candidate utterances are used. It should be recognized, however, that this does not necessarily constitute any limitation on the number or types of utterances that may be accommodated.

Figure 1:
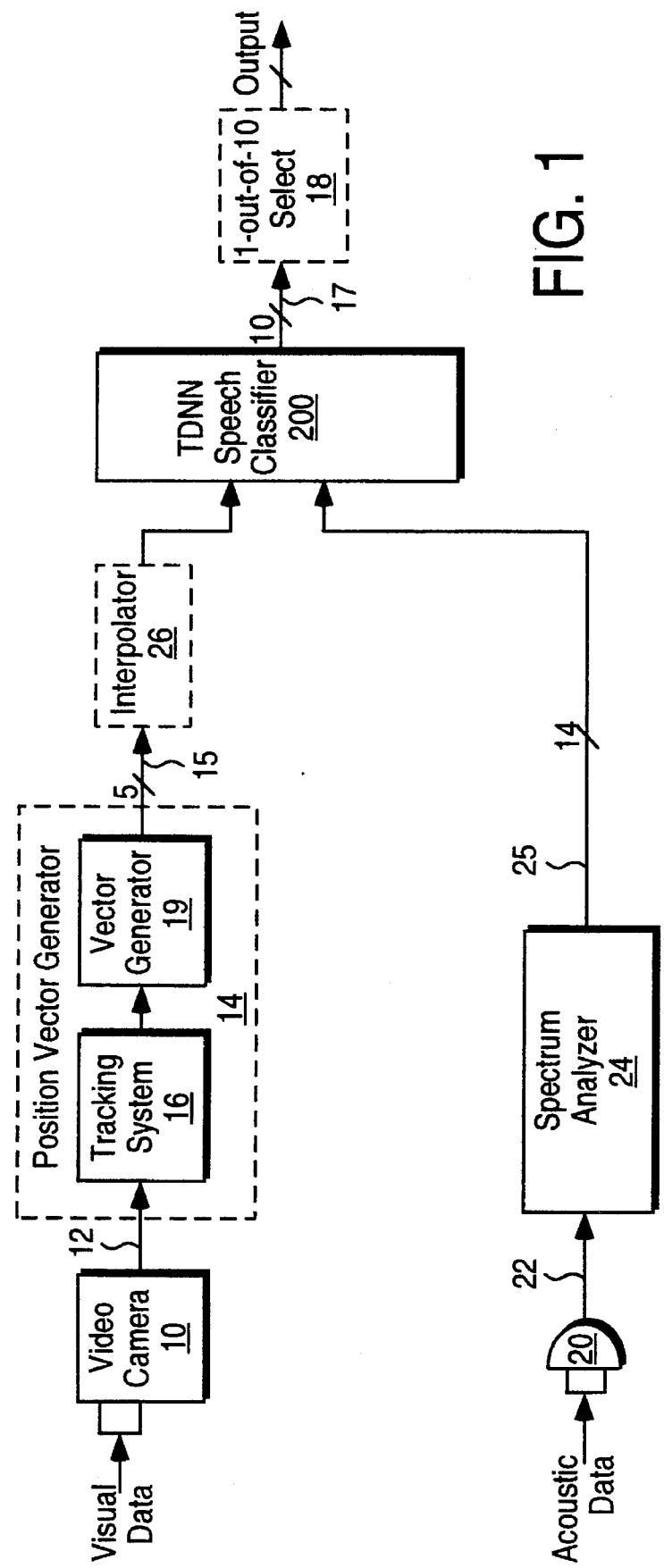
FIG. 1 is a block diagram of an acoustic and visual dynamic speech recognition system.

The present invention is a system for speech recognition that uses dynamically varying acoustic and visual signals for improved speech recognition performance. FIG. 1 shows a simplified block diagram of an embodiment. Acoustic speech data is collected by microphone 20 which, by means of output line 22, applies the electrical signal replica of the acoustic information to spectrum analyzer 24 where the acoustic energy is applied to a bank of 14 filters. The short-term time-varying energy output of each of the 14 filters is measured, normalized, and applied to the 14 output lines 25 as a time varying vector with 14 components.

Simultaneously, video camera 10 captures the associated visual data generated from a set of markers used to describe the lip and mouth movement generated by a given speech utterance. This raw video information is delivered by line 12 to the lip and mouth position vector generator 14 where the time varying position of the lip and mouth markers is normalized for head tilt and magnitude yielding a time varying vector on the five output lines 15 that describes the lip and mouth activity associated with the acoustic utterance.

Lip and mouth position vector generator 14 comprises a tracking system 16 for tracking the position of light emitting or light reflective fiducial markers placed on and around the lips of the speaker, and vector generator 19 that extracts and normalizes select distances between fiducial markers. This apparatus was implemented by using the computer based two-dimensional motion analysis system manufactured by Motion Analysis Corporation, 3650 North Laughlin Road, Santa Rosa, Calif. 95403, under the trademark ExpertVision. However, it is not necessary that this particular system be used.

The ExpertVision video tracking system uses video equipment to capture the movements of objects. Reflective markers are placed at locations of interest. The system can capture and analyze data recovered from a video camera 10 (or tape) at the standard video frame rate of 60 Hz or up to 200 Hz.

The raw video data from video camera are fed to the video processor subsystem which isolates the marker images and converts them to digitized video outlines in real time. The video processor provides the function of tracking system 16 by producing x and y coordinates of the marker edges to the host computer for subsequent processing. The detected screen positions, at video frame rate intervals, are expressed in a rectangular grid 256 pixels wide (in the x direction) and 240 pixels high (in the y direction).

The video image of the markers are reduced to centroids by the host computer software. The centroid of each reflective marker is determined by averaging the coordinates of the individual pixels forming the outline of the marker. The centroids of each marker are tagged and linked from frame-to-frame to form a trajectory. Additional host computer software is used to generate and normalize the set of visual distance vectors as described below and functionally indicated by vector generator 19 of FIG. 1.

Both of the time varying vectors on lines 15 and 25 are applied to a time delay neural network ("TDNN") speech classifier 200 wherein the neural network produces ten output signals on lines 17. Each of the output lines 17 is exclusively associated with one out-of-ten possible speech utterances that the TDNN 200 is trained to recognize. The signal magnitude on each of the ten lines is representative of the probability that its associated utterance was made. Output network 18 (shown dotted) is an optional one-out-of-ten classifier (well-known in the art) that selects the most probable utterance by choosing the utterance corresponding to the highest level (probability) line of the ten lines 17. Because TDNN classifier 200 is capable of examining a time varying data stream, the exact knowledge of the position in time of the acoustic and visual information is not required.

Figure 2:
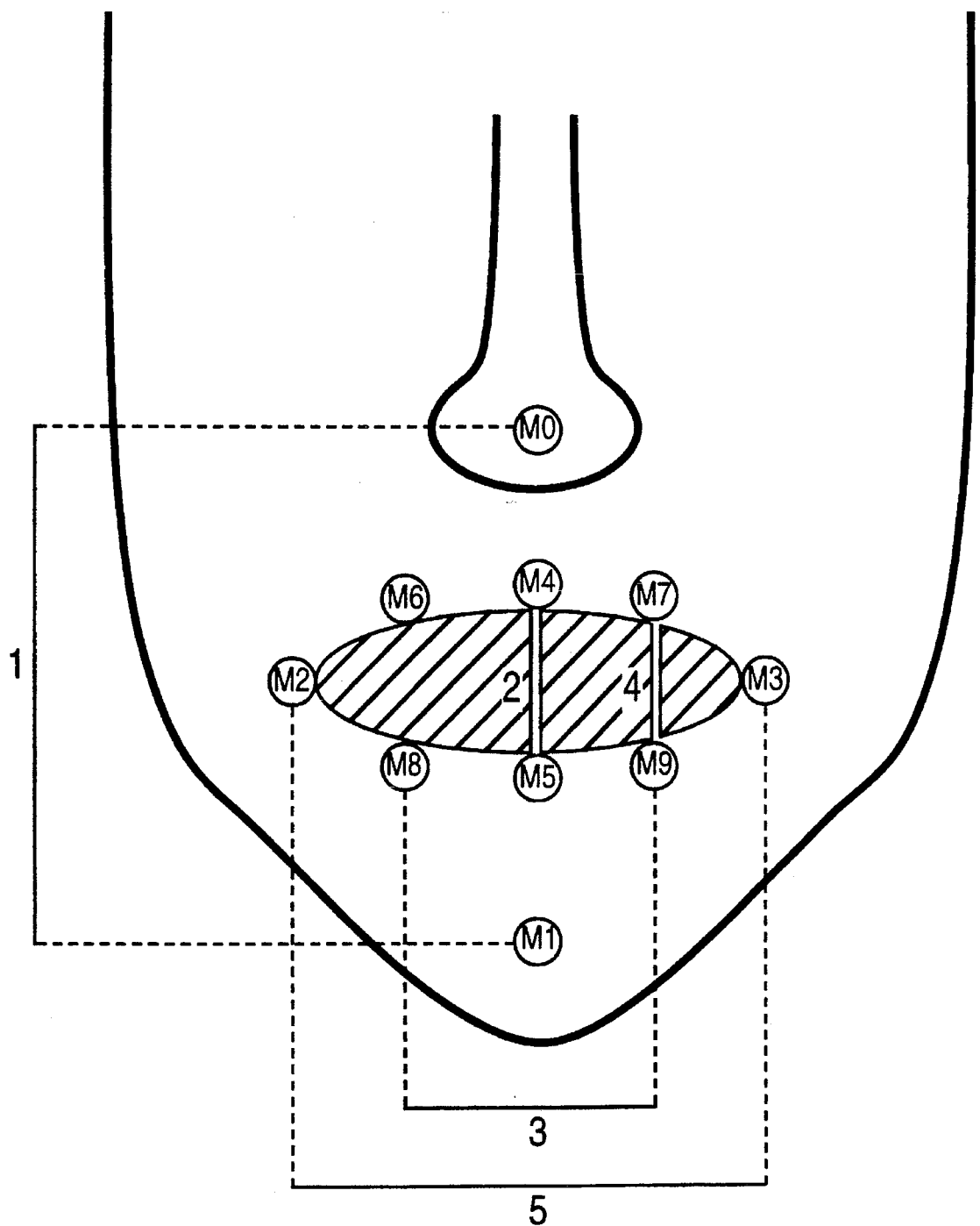
FIG. 2 shows the placement of visual fiducial markers on mid about the lips of the speaker.

FIG. 2 shows the placement of the ten reflective markers (M0,9) on each speaker's face that were used in one embodiment. The positions of the ten fiducial markers were: the tip of the nose (M0), the center of the chin (M1), the left corner of the mouth (M2), the right corner of the mouth (M3), the top center of the lips (M4), the bottom center of the lips (M5), and four points on the lips which are approximately halfway between the center of the top lip and the left and right mouth corners (M6, M7), and between the center of the lower lip and the left and right corners of the mouth (M8, M9). This set of fiducial markers were used to establish the general shape and movement of the lip and mouth area. This particular arrangement has the beneficial advantage of simplicity when compared to the computationally intensive problem of deriving the same information from the massive volume of data generated by sequences of video pixel images.

The position of the reflective fiducial markers on each talker's face were recorded by video camera 10 at a 60 Hz frame rate and then transformed by position vector generator 14 into visual feature vectors having five components as shown in the table below.

| No. | Component Feature | Comments |
| --- | --- | --- |
| 1 | Nose-chin distance | (M0-M1) |
| 2 | Mouth-opening | (M4-M5) |
| 3 | Horizontal mid-lip distance | Average separation of (M6-M7) and (M8-M9) |
| 4 | Vertical mid-lip distance | Average separation of (M6-M8) and (M7-M9) |
| 5 | Mouth corner separation | (M2-M3) |

This particular choice of vector component features was made so that the various distances across the mouth and face can readily be made independent of shifts and rotations of the head. This was accomplished within vector generator 14 by first rotating the head so that a line drawn through fiducial markers M0 and M1 was vertical, then the three vertical distances (M0-M1, M4-M5, and the average distance of M6-M8 and M7-M9), and the two horizontal distances (M2-M3, and the average distance of M6-M7 and M8-M9) were computed.

Further normalization of the component features was required because of cross-subject differences in facial measurements. Also, it was noted that for each speaker, the mouth was in a partially open rested position at times. The first normalization step provided a set of facial measurements characteristic of the size of each speaker's face by averaging the vectors corresponding to all rested position times. Then, each visual vector in the sequence was normalized by subtracting the rest value average from each component and scaling the magnitude so that each component value is assigned a value of plus or minus one when its level corresponds to plus or minus two standard deviations from the mean.

Although the specific set of facial movement features enumerated above were used in reducing the speech recognition to practice, other equally representative sets of dynamic measurements could be used to convey the essential visual information. This could result in a different, but effective, dynamic visual data vector. For example, a video camera could produce a dynamic pixel image of the speaker's mouth and lips. The dynamic shape could be characterized by measuring the distance between the shadows below the upper and lower lips caused by overhead lighting. A set of such measurements across the mouth would describe the dynamic shape.

The acoustic data signals occurred within a time window of one second duration and were taken simultaneously by a cardoid microphone 20, and then sampled and digitized at a 8012 Hz sampling rate using 8-bit mu-law encoding (equivalent to digital telephone line quality). A fourteen value mel power spectrum analysis was performed by spectrum analyzer 24 by the use of a discrete Fourier transform on 256 data point frames centered at intervals of 5 ms in order to simulate the fourteen mel power spectral analysis filters. Each 256 data point frame was windowed by a Hamming window function to reduce spectral leakage. Application of the discrete Fourier transform to the windowed data and forming the squared magnitude of the Fourier coefficients resulted in a 128 point uniform resolution power spectrum. However, the mel scale 14 band power spectrum has a frequency scale, F, logarithmically related to the normal linear frequency scale, f, as follows:

$$F = \ln(1 + f/700).$$

This mel frequency scale is based on psychoacoustic frequency scaling experiments that show that human judgments of the relative pitch of two sinusoids are not equivalent to their actual arithmetic ratio. Thus, the above expression relates the judgment of perceived pitch, F, to the physical measurements of frequency, f. Note that although the mel power spectrum was used, a variety of power spectrum types, including those based on uniform or exponentially scaled band intervals, may also be effective in this application.

Figure 3:
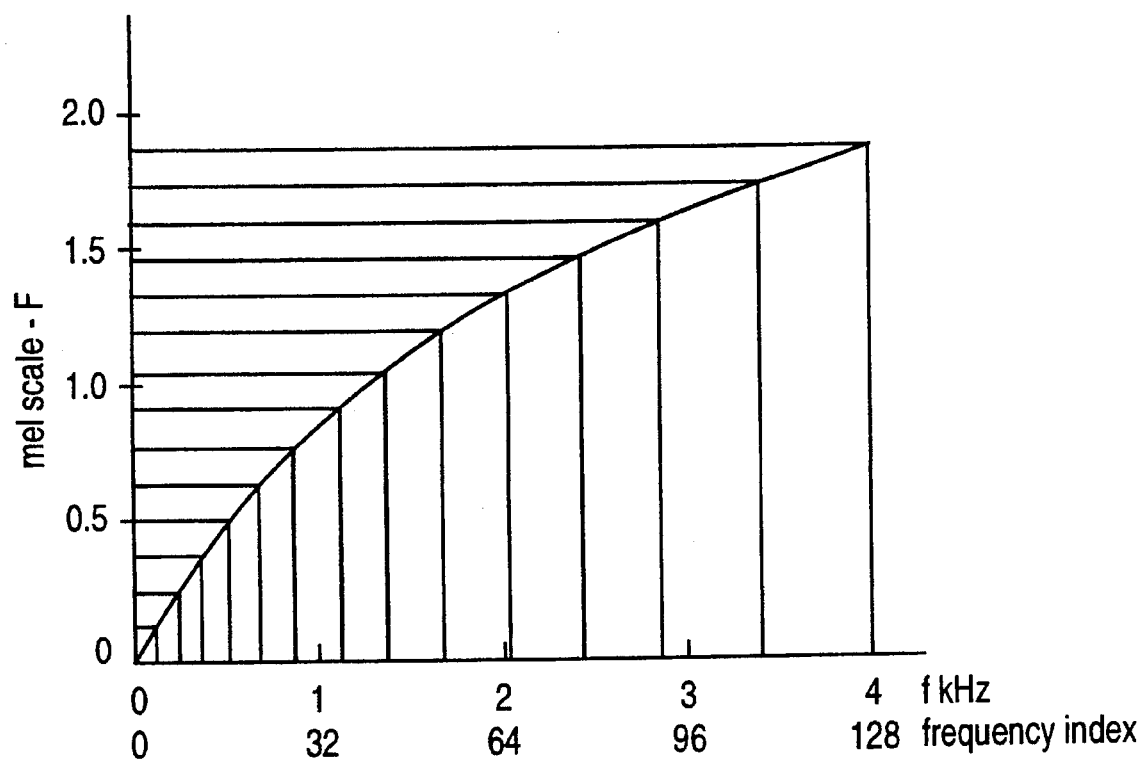
FIG. 3 shows the relationship between the uniform mel frequency bands and the corresponding non-uniform linear frequency bands.

FIG. 3 shows a graphical plot of the mel frequency, F, versus actual frequency, f. Fourteen uniform width bands on the mel scale are shown on the vertical scale together with their projection onto the actual frequency scale as non-uniform bands that increase with increasing frequency f in accordance with the above expression. The lower abscissa scale relates the Fourier coefficient frequency index to the actual frequency. Thus, the 14 mel scale uniform bandwidth filters are simulated by summing the spectral power in the corresponding linear scale non-uniform bands, as shown. A more statistically stable mel scale power spectrum is generated each 5 ms or 200 times a second by averaging sequential pairs of spectrums which reduces the effective output spectrum rate to one each 10 ms (100 spectra per second). The next processing step performed by spectrum analyzer 24 is the forming of the logarithm of each mel spectrum to obtain a 14 component log mel spectral vector. Normalization of each set of log mel spectra corresponding to a given utterance was accomplished by calculating the mean, and extracting the maximum and minimum of all values in the set. The log mel spectral sets were then scaled and biased to cause the new mean to be zero and the maximum value of each log-spectrum to be one. The normalized log mel spectral vectors are made available on output lines 25 of spectrum analyzer 24.

Because, in one embodiment, the video frame rate of camera 10 was 60 frames/second while the spectral generation rate of spectrum analyzer was 100 spectra per second, an additional processing step was required to match the two rates. This is shown graphically in FIG. 1 by the dotted line box 26 labeled "interpolator" because it is only required if the video frame rate and the spectral frame rate are not the same. In this case, successive video data frames (vectors), each comprising the five vector components previously described, were interpolated using a (sin x)/x type of interpolation kernel in order to generate a new sequence of vectors at a rate of 100 per second. In other words, the value of the interpolated $k^{th}$ sample occurring at time=k/100 seconds (k=0, ±1, ±2, . . .), i.e., at uniform time intervals of 10 ms, is given by:

$$X(k/100) = \sum_m x(m/60) \cdot \frac{\sin\pi(k/100 - m/60)}{\pi(k/100 - m/60)}$$

where:

x(m/60) is the value of the vector component at time=m/60;

m is the original integer time index incremented at intervals of 1/60 seconds;

k is the new time index incremented at intervals of 1/100 seconds; and

X(k/100) is the interpolated values at the 1/100 second intervals.

This operation may be performed by standard convolution (digital filtering) techniques. Other possible interpolation kernels, including linear, quadratic, and higher order polynomial type kernels, could also be used for interpolation without significantly affecting the performance.

Thus, the five output lines 15 of visual vector generator 14 and the 14 output lines 25 of acoustic spectrum analyzer 24 combine to form a 19 component time varying audio-visual ("AV") vector to be applied to TDNN 200.

In order to accommodate utterances that may be of variable length, as well as somewhat unpredictable in the time of utterance onset, the neural network employed for speech classification was chosen to be a time delay neural network (TDNN) similar to that described by Waibel, A., in an article entitled "Modular Construction of Time-Delay Neural Networks for Speech Recognition," in Neural Computation 1, 39–46 (1989).

Figure 4A:
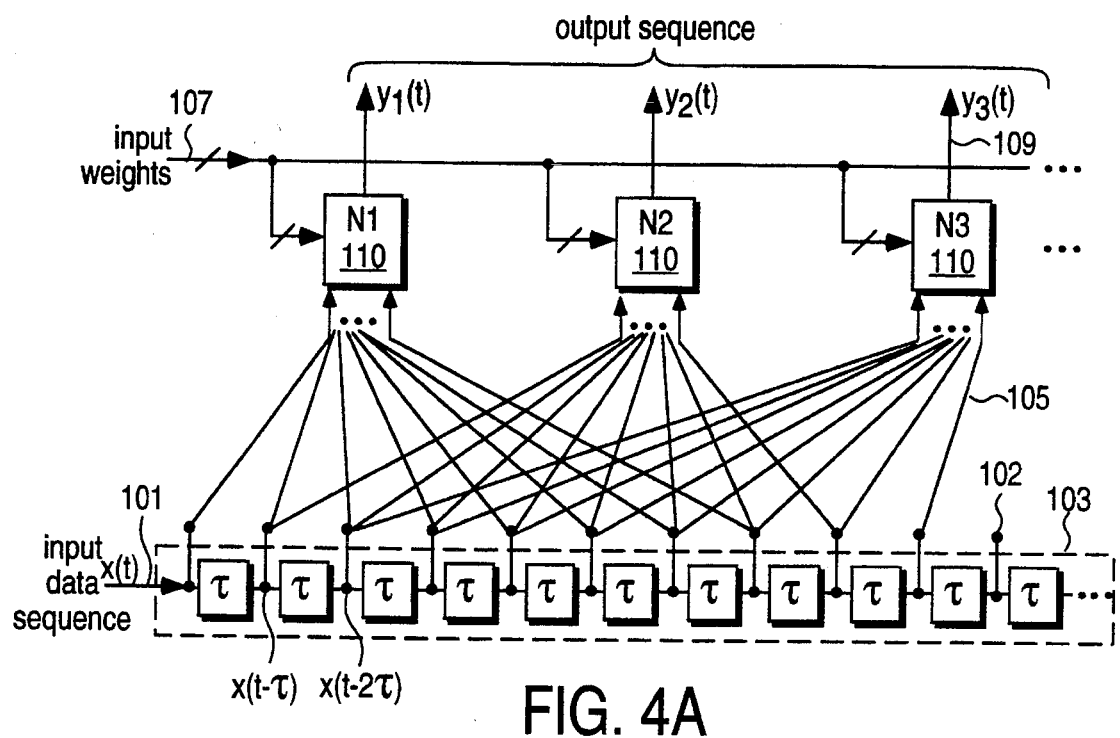
FIGS. 4A and 4B shows two equivalent implementations of a single layer time delay neural network (TDNN).

FIG. 4 shows two functionally equivalent implementations of a TDNN. FIG. 4(a) comprises a uniformly tapped delay line 103 that accepts an input data sequence, x(t), on input line 101. The signals on delay line output taps 102 constitute a time sequence vector representative of the time sequence x(t) that has been applied to delay line 103 with the older data being to the right, that is each tap has an output that represents the input sequence value τ seconds earlier than the one immediately to the left. At any given instant of time, a time history of the input sequence is available at output taps 102. A selected set of contiguous taps are connected to lines 105 of neuron 110 labeled N1. Similarly, a set, having an equal number of tap 102 inputs but shifted by one delay unit, τ, is applied to neuron 110 labeled N2. As shown, the TDNN structure may have any number of additional neuron 110 units connected in the same manner, each shifted by one unit of delay, τ. Each neuron 110 is identical in structure and uses the same set of synaptic weights that are applied via lines 107. Thus, the output of each neuron 110 on output lines 109 represents a new data sequence $\{y_k(t)\}$ shifted in time by the τ interval from its neighboring neuron 110 output.

Figure 4B:
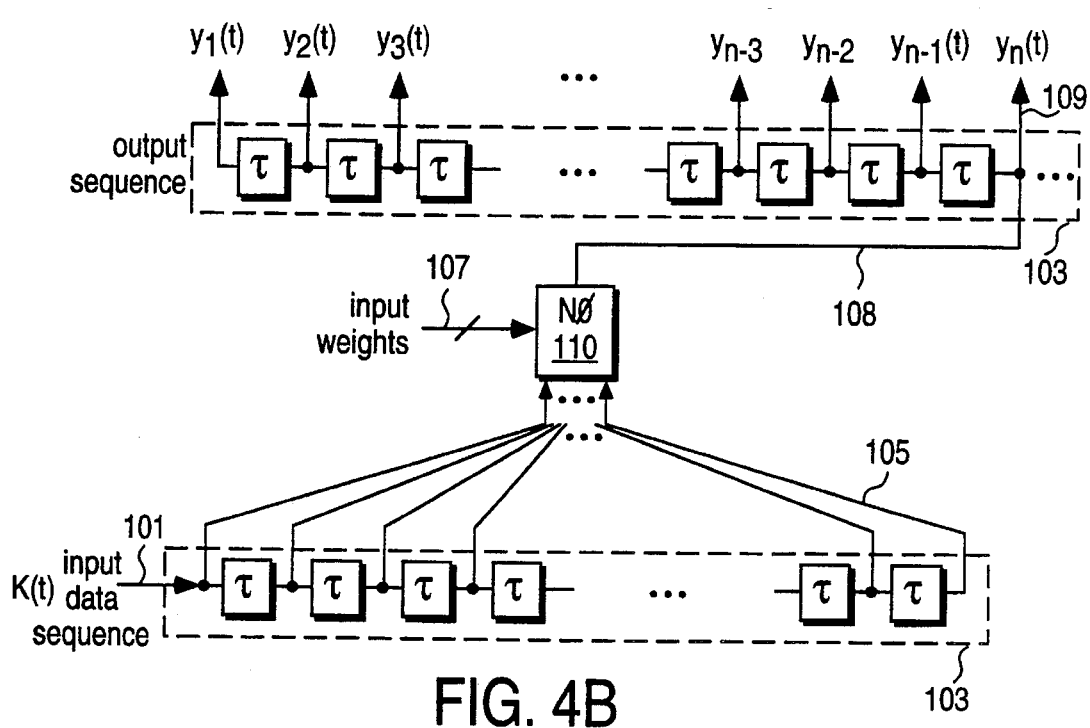

The hardware conserving TDNN structure shown in FIG. 4(b) uses a single neuron 110 in a multiplexed mode. The input data sequence applied to tapped delay line 103 via input line 101 produces an image of its past values at τ second intervals on output lines 105 which are applied in parallel to neuron cell 110. The set of weights (identical to those used in FIG. 4(a)) are applied by input lines 107. Each τ interval, neuron cell 110 produces an output value on line 108 which is applied to a second tapped delay line 103. If the second delay line 103, which belongs to the next higher layer, has n taps as shown, each (n–1) τ second interval output taps 109 have a new n sample output vector that is identical to that which would be produced by the TDNN of FIG. 4(a) given the same input data weights.

Both structures of FIG. 4 are suitable for accepting a single time varying vector component on its input tap 101. Hence, the structures shown must be replicated for each component of the input vector. In general, the input weights would be unique for each component as determined by the training procedure.

The time delay unit, τ, is chosen so that aliasing of input data is minimized. If the value of τ is substantially less than the Nyquist sampling interval, the values at adjacent output taps 109 would be highly correlated and could lead to instabilities in training because of the excess degrees of freedom (redundancy) used in the neural network. If the interval, τ, is greater than the Nyquist sampling interval, aliasing is introduced that may lead to incorrect classification of input data. An acceptable value was determined to be approximately 10 milliseconds.

The number of delay elements per delay line has to be sufficient to ensure that a complete utterance epoch is spanned by the total delay of (n–1) τ, for the delay line structure with n output taps. For the class of utterances used, a span of 100 elements of 10 ms delay (1000 ms overall) was found to be adequate. Shorter spans of observation might degrade classification by not including the entire epoch and longer spans might degrade classification by including too much superfluous data.

In a practical speech recognition system, a multilayer vector input TDNN is required. This may be realized by cascading a number of single layer TDNNs so that the output sequence of a given layer becomes the input sequence to the next higher layer. In this manner, each layer maps an input time sequence into another output time sequence and ultimately maps the input time sequence of features (acoustic and visual) into a time sequence of attributes (classifications). Because the TDNN is a subset of feedforward neural networks it is trainable using the well-known backpropagation or other gradient descent algorithms. In addition, the TDNN has the desirable property of sequentially performing an identical transformation on a sequence of feature time windows at incrementally variable instances of time. Unlike more conventional feedforward neural networks, the input data sequence does not need to be precisely aligned to any absolute time reference in order to allow proper training. The TDNN structure acknowledges that patterns of interest within the input data sequence may occur anywhere in time, and during learning, the TDNN attempts to find exemplar patterns in the training data sequence regardless of when they occur.

However, if it is desired that the network output be a single set of attributes, a fixed duration feature sequence may be stored in the input delay line. The duration should be selected so that the time span (window) of the delay line is sure to include the sequence of interest. If each succeeding layer of the TDNN is a function of the window time span, the output for each attribute of the final stage may be averaged to a single value of the window interval.

Figure 5A:
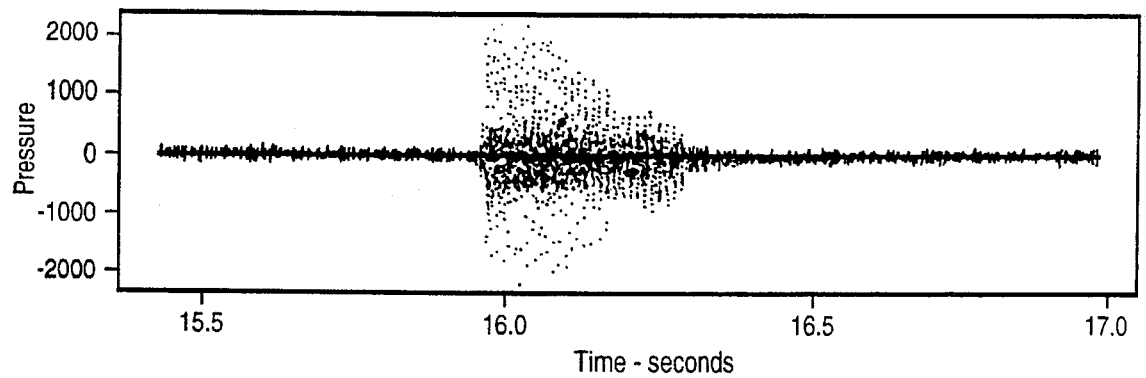
FIGS. 5A and 5B shows an electrical analog of a typical utterance together with its spectrogram.
Figure 5B:
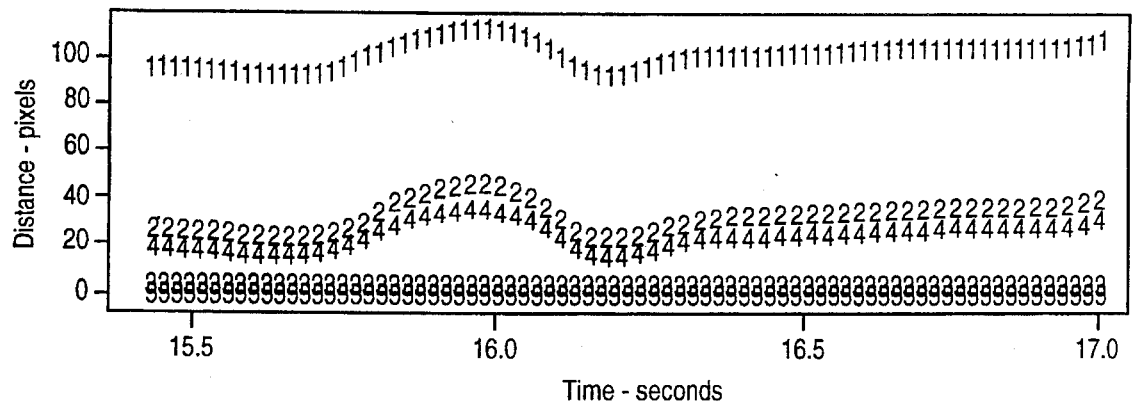

FIG. 5 shows an example of a typical spoken utterance. In FIG. 5(a), the electrical signal representative of the acoustic pressure is shown beginning at about 15.4 seconds and ending by 17.0 seconds. FIG. 5(b) shows the five components of the visual vector of the same utterance also beginning at about 15.4 seconds and ending about 1.6 second later (17.0 seconds). Thus, a window of 1 second duration would appear adequate to include most of both acoustic and visual signals.

For the embodiments described below, ten possible types of utterances were spoken into the speech recognition system and ten output values were generated at the output, each representing the probability of one of the ten possible utterances having been spoken. The network structure comprised two TDNN type layers followed by a stage of time averaging and probability normalization.

The five different embodiments of a speech recognition system to be described include:

a) the VO system using visual data only;

b) the AO system using acoustic data only;

c) the A×V system, a high level combination of the AO and VO system;

d) the AV system, with intermediate level (classification layer) combining of the AO and VO system; and e) the full AV system with integrated processing of acoustic and visual data.

Figure 6:
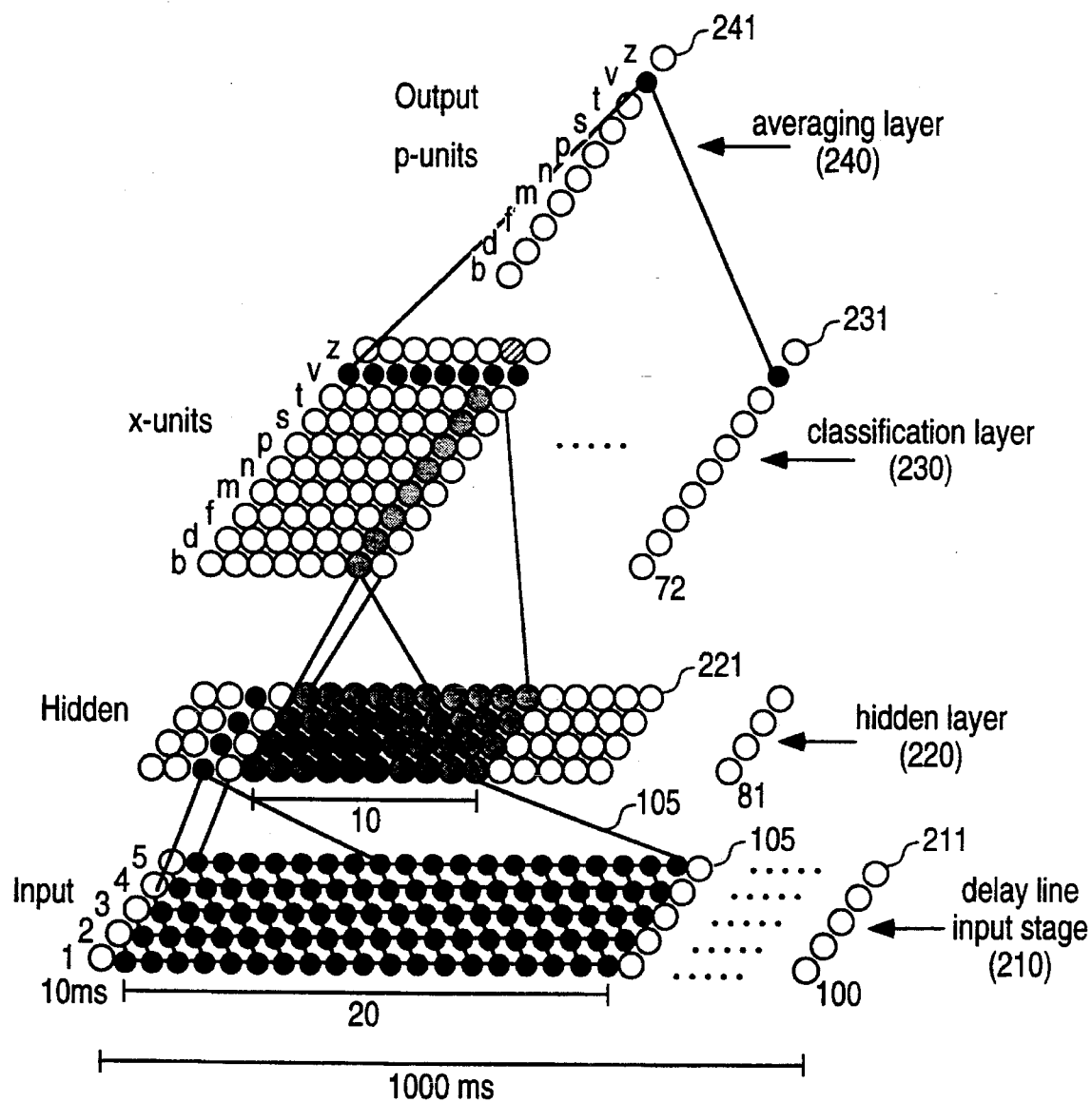
FIG. 6 shows the architecture of a visual only (VO) multilayer TDNN.

The architecture of a TDNN network is shown in FIG. 6 as used in a VO embodiment of a speech classifier 200 based on reading the visual facial markers only was implemented using the five distance features previously described. No acoustic data was used for this embodiment. The delay line input stage 210 comprises five delay line 103 units each with 100 output taps, each delay line 103 storing one of the five components of the visual vector provided by vector generator 14 of FIG. 1. The delay lines were simulated in software. The time increment, τ, between stored values is 10 ms so that the input time sequence window spans 1000 ms.

Hidden layer 220 comprises four rows of neuron cells, each having 81 neuron cells with 5×20 inputs to each cell. Each neuron in a given row is connected to 20 adjacent delay line values of the five delay lines. The reduction from five to four rows provided a modicum of data compression in each row.

The classification layer 230 comprises 10 rows, one for each of the utterances to be detected and 72 neuron cells long. Each neuron accepts a field of 40 input lines: four rows from hidden layer 220 with ten contiguous hidden layer neural outputs. Each of the ten resulting rows has 72 neuron cells corresponding to the 72 possible values available from the time shifted output of the hidden layer. Each value at the output of the neurons in a given row of classification layer 230 corresponds to the probability that its corresponding utterance occurred during one-out-of-72 time intervals of 290 ms spaced at 10 ms intervals and spanning the original (input stage) data window of 1000 ms. The 290 ms resolution results from the 20 ms window used as an input to hidden layer 220 and the subsequent 10 unit window used as in hidden layer 220.

Averaging layer 240 comprises 10 neuron cells, each associated with a specific row of the classification layer and, hence, with a specific one of the ten allowable utterances. The values in each output row of classification layer 230 is indicative of the likelihood of that particular utterance having occurred during a 290 ms interval corresponding to that cell. These 72 inputs are combined by the corresponding neuron cell in the averaging layer to produce a value at its output representative of the probability that utterance was spoken any place during the input stage 210 observation window of 1000 ms.

The acoustic only (AO) speech recognition system uses the same type of architecture as the VO system architecture shown in FIG. 6 with parameters adjusted to accommodate the 14 component log mel scale spectral feature vectors provided by spectrum analyzer 14 of FIG. 1 at intervals of 10 ms. Thus, the delay line input stage 210 had an array of 14 rows with 100 data values as inputs to hidden layer 220. Each row corresponds to a 1000 ms of log mel scale values from one of the set of 14 output filters of spectrum analyzer 14.

The AO hidden layer 220 comprised four rows of 96 neuron cells providing a 14 to 4 feature compression. Each neuron 221 is connected to 5 contiguous input stage time samples of each of the 14 input features (a total of 70 input feature values per neuron). The input window of 5 units (50 ms) is a typical time interval for most important acoustic features such as bursts and transitions. Thus, each successive neuron in a given row of hidden layer 220 accepts a 14 row by 5 column array of input values from input stage 210, shifted by one 10 ms interval.

Each neuron 231 of the AO classification layer 230 accepts a fan-in of 4 feature rows and 25 time columns from hidden layer 220. Each successive column of neurons 231 receiving inputs from hidden layer 220 that are shifted by one column time unit of 10 ms. The 25 column window was chosen so that the total effective time window seen by classification layer 230 is 290 ms (((5−1)+25)×10 ms), the same effective window used in the VO speech recognition network described above. A total of 720 neurons comprising AO classification layer 230 are arranged in 10 rows of 72 neurons each. As in the case of the VO speech recognition network, each of the 10 rows corresponds to one of the ten allowable utterances.

The AO TDNN classifier 200 output layer 240 comprises one column of 10 neuron cells 241, each cell connected to a distinct feature row of classification layer 230, a fan-in of 72. The values at the output of averaging layer 240 are each representative of the probability that its corresponding utterance occurred somewhere within the 1000 ms data window presented in input stage 210.

Figure 7:
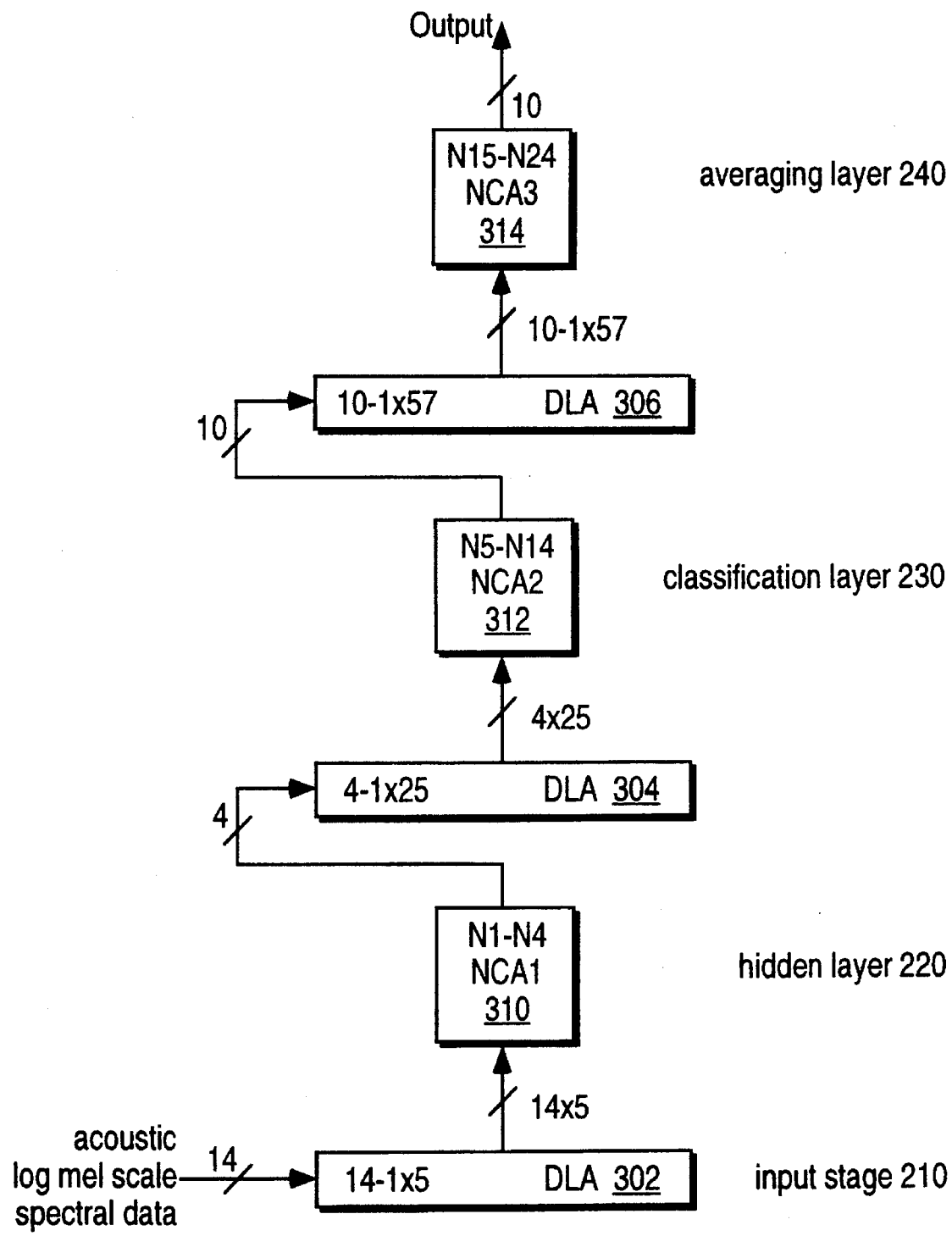
FIG. 7 shows a hardware conserving TDNN architecture.

FIG. 7 is another embodiment of the AO TDNN, a functional equivalent to the network described above that minimizes the amount of hardware required by use of neuron cell multiplexing. The 14 log mel scale spectral data components of the acoustic vector signal is applied to delay line assembly (DLA) 302 comprising 14 tapped delay lines, each with a five data value capacity (in this context, a delay line is the equivalent of a shift register, analog or digital). Once the delay line is filled, neuron cell assembly (NCA1) 310 comprising four neuron cells (N1–N4), accepts the field of 14×5 values from the taps of DLA 302 and connects this 70 value field to each of the 70 input terminals of the four cells (N1–N4). NCA1 310 generates four distinct output values, one for each of the N1–N4 neuron cells and delivers them to the input of DLA 304, the hidden layer delay line assembly. DLA 304 clocks in the four values. 10 ms later, a new value arrives at the input to DLA 302 causing the contents to shift fight by one unit and thus dropping-off the oldest set of 14 spectral data values. The new set of 14×5 data points is then applied to each of the cells of NCA 310 providing at its four output terminals a new four component vector that is clocked into the four delays of DLA 304. This process continues and eventually causes DLA 304 to be filled. At this point in time, the ten neuron cells (N5–N14) of NCA 312 each compute an output for the ten categories of utterances and deliver for storage the 10 component vector to DLA 306, which comprises ten delay lines each with a capacity of 72 values.

Thus, each 10 ms period thereafter, a new vector is calculated by NCA 310 which is shifted into DLA 304. In turn, NCA 312 computes a new ten component vector that is shifted into DLA 306. When DLA 306 is filled to capacity, the contents of each of the ten 1×72 delay lines is applied to its associated averaging neuron (N15–N24) of NCA3 14. The first set of 10 outputs represents the probability that its associated utterance was spoken during the first 290 ms.

As spectral data continue to arrive each 10 ms interval, new values of output probabilities are computed. Thus, the second computed value would correspond to the probability of an utterance occurring in a 290 ms window shifted by 10 ms from the first. Succeeding output probabilities correspond to 290 ms windows shifted by 10 ms relative to the previous window.

Although the operation of the TDNN of FIG. 7 was described for use in an AO speech recognition system, it is clear that the same principle of operations would apply if a similar structure were to be used in a VO speech recognition system, consistent with the prior descriptions of operation relating to FIG. 6.

The AO and VO systems described work independently on acoustic and visual speech data respectively. In other words, they are the equivalent of the system shown in FIG. 1 in which either the visual data or the acoustic data is nulled. It is reasonable to expect that the enhancement of an AO system by visual data would increase the classification accuracy especially under adverse acoustical environmental conditions. Three embodiments of a combined acoustic and visual speech recognition system will be described.

Figure 8:
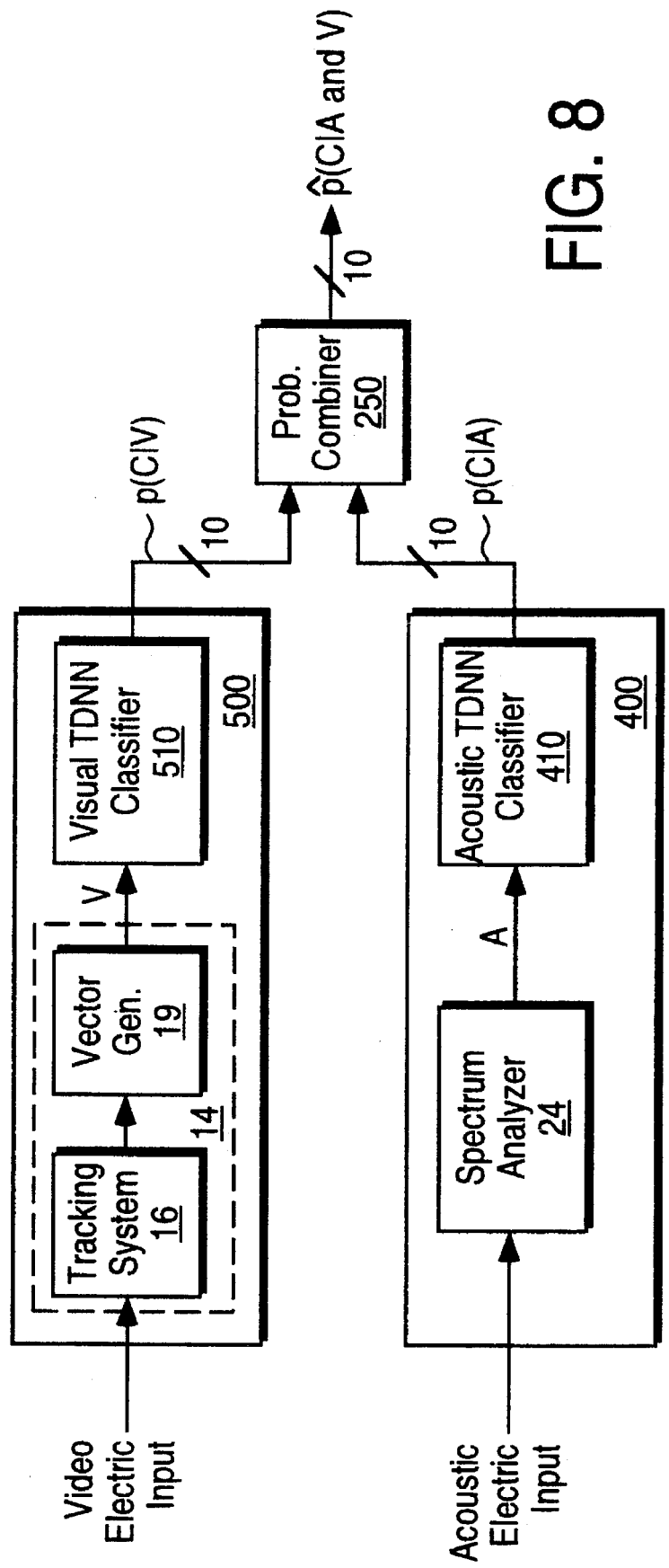
FIG. 8 is a block diagram of an acoustic and visual speech recognition system that combines the output of separate acoustic and visual recognition systems.

The first, referred to as the A×V system and shown in FIG. 8, comprises AO speech classifier 400 and VO speech classifier 500 together with an additional network layer 250 for combining the output probabilities of both systems into a single set of probabilities.

AO classifier 400 comprises a log mel scale spectrum analyzer 24 that accepts the electrical analog of a speech signal producing at its output a 10-component acoustic vector that is used as the input to acoustic TDNN classifier 410 as previously described. The output of AO classifier 400 is a probability vector describing the probability that each of the 10 allowable acoustic utterances were uttered, based on the acoustic data only. It is supplied to the probability combiner 250.

Similarly, VO classifier 500 uses an electrical image of the fiducial markers to define a lip and facial feature vector that is associated with the corresponding acoustical feature vector, as an input to lip and mouth position vector generator 14. The output visual vector generated by the fiducial marker tracking system and vector generator of unit 14 is applied to acoustic TDNN classifier 510 that produces a ten component visual probability vector which is supplied to probability combiner 250 representing the probability that each of the ten possible utterances occurred based solely on the visual data.

Let p(c|A) be the conditional probability that utterance c occurred, given the associated acoustic data vector, A, and p(c|V) be the conditional probability that utterance c occurred, given the associated visual data vector, V. Thus, p(c|A) corresponds to the $c^{th}$ value of the vector output of classifier 410 based on vector A having been generated by spectrum analyzer 24, and p(c|V) corresponds to the $c^{th}$ value of the vector output of classifier 510 based on vector V having been supplied by generator 14.

It should be noted that p(A|c), the conditional probability of vector A occurring, given a category c utterance, and p(c|A), the conditional probability of a category c utterance, given acoustic vector A, are related by the apriori probabilities p(A) and p(c) as follows:

$$p(A|c) \cdot p(c) = p(c|A) \cdot p(A)$$

or $$p(A|c) = p(c|A) \cdot p(A)/p(c)$$

Thus, acoustic TDNN classifier 410 and visual TDNN classifier 510 may be trained to produce either p(A|c) or p(c|A) and p(V|c) or p(c|V), respectively, based on the relative frequencies of p(A) and p(c) in the training data.

If vectors A and V are independent, then the combined probability of the $j^{th}$ utterance, $c_j$, given acoustic data vector, A, and visual vector, V, is $$p(c_j|A,V) = \frac{p(A|c_j) \cdot p(V|c_j) \cdot p(c_j)}{\sum_{i=1}^{10} p(A|c_i) \cdot p(V|c_i) \cdot p(c_i)}$$

which is the desired output from probability combiner 250.

If (and only if) $p(c_j)=p(c_i)$ for all i and j, then the above expression is simplified so that $$p(c_j|A,V) = \frac{p(A|c_j) \cdot p(V|c_j)}{\sum_{i=1}^{10} p(A|c_i) \cdot p(V|c_i)}$$

Under this condition, the above expression shows the $p(c_j|A,V)$ may be formed by the product of the $j^{th}$ output of classifier 410 and 510, respectively, and normalized by the sum of all the ten product terms.

The product terms in the above expressions may be achieved several means including analog or digital multipliers and sigma—pi ($\Sigma\pi$) neural cell network in which corresponding p(A|c) and p(V|c) terms are used to "gate" one another. Similarly, the same term may be generated by a 20 input $\Sigma\pi$ neural cell network in which corresponding A and V probability vector components gate one another to form product terms and the output is formed by the sum of the product terms. Division of each of the products by the sum term may be implemented in compatible technology using analog or numerical computing means.

Figure 9:
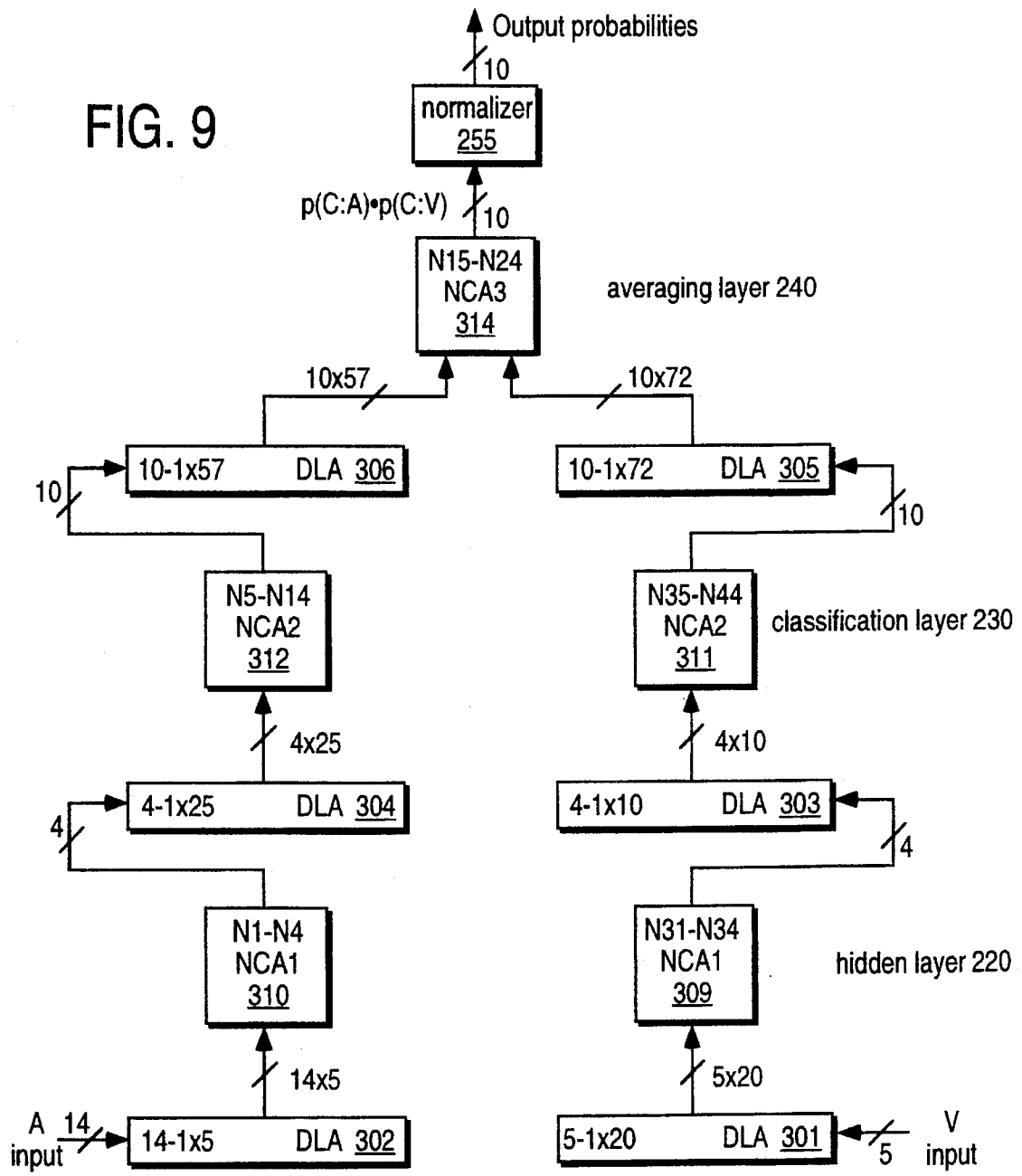
FIG. 9 shows a hardware conserving embodiment of a A×V TDNN speech classifier.

FIG. 9 shows a hardware conserving embodiment of the A×V system TDNN speech classifier 200. Acoustic and visual data vectors are clocked into delay line (DL) 302 and 301, respectively, at 10 ms intervals. The acoustic and visual data flows follow distinct paths up until the last NCA3 stage. By referring to FIG. 7, it may be seen that the input acoustic data vector in FIG. 9 is processed in the same manner and by the same hardware as in AO process up until NCA3 314 located at the averaging layer. Similarly, the visual data vector, V, in FIG. 9 is processed in the same manner as described in FIG. 6 for the VO system, except for the final NCA3 314 unit. The final probabilities, p(c|A,V), are formed by the ten sigma-pi neuron cells that comprise NCA3 314 and normalizer unit 255. Normalizer unit 255 applies the scaling factor, k, to form the ten output vector components p(c|A,V)=k·p(c|A)·p(c|V) for c=1, 2 . . . , 10.

Although a TDNN based AO acoustic processor has been described, it is not essential to the A×V embodiment. The A×V system may be designed using any acoustic speech recognition processor that is functionally equivalent, even though it does not use a TDNN. The outputs of the AO and VO subsystem would be combined as described in order to yield a more accurate classification than either system would yield by itself. Similarly, any acoustic vector generator that produces an effective acoustic vector which characterizes the utterance with reasonable statistical reliability may be used as an acoustic pre-processor in any of the combined acoustic and visual speech recognition systems.

Figure 10:
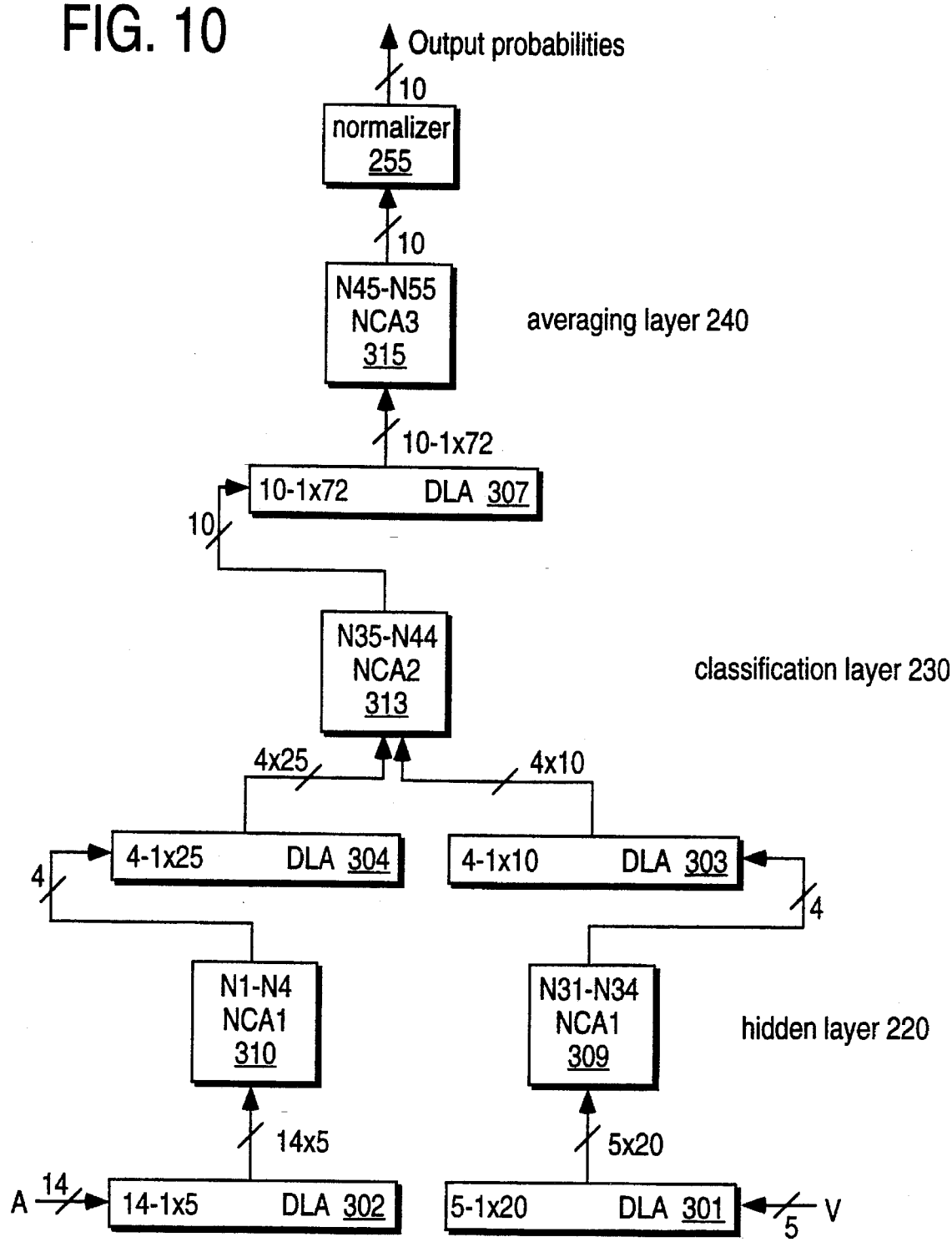
FIG. 10 shows a hardware conserving embodiment of another TDNN speech classifier.

FIG. 10, another embodiment for TDNN classifier 200 of FIG. 1, is referred to as the AV system classifier. In this case A and V vector inputs are processed separately through the hidden layer 220 comprising NCA1 310 and NCA1 309. The hidden layer output values are stored in DLA 304 and DLA 303 where the acoustic 4×25 field of values from DLA 304 and the 4×10 field of values from DLA 303 are applied to the ten 140-input neuron cells (N35–N44) of NCA2 313. This earlier merging of acoustic and visual data results in a richer set of cross terms upon which a solution may be sought in the training process, generally leading to better performance of the overall system.

After processing by NCA2 313, the results are passed on to the averaging layer 240. NCA3 315 comprises ten neuron cells (N45–N55), each of which operates on one of ten delay lines in DLA 307. The unnormalized probability product, $p(c|A) \cdot p(c|V)$, is formed by NCA3 315 and passed on to normalizer unit 255 for forming the final output probabilities, $p(c|A,V)$.

Figure 11:
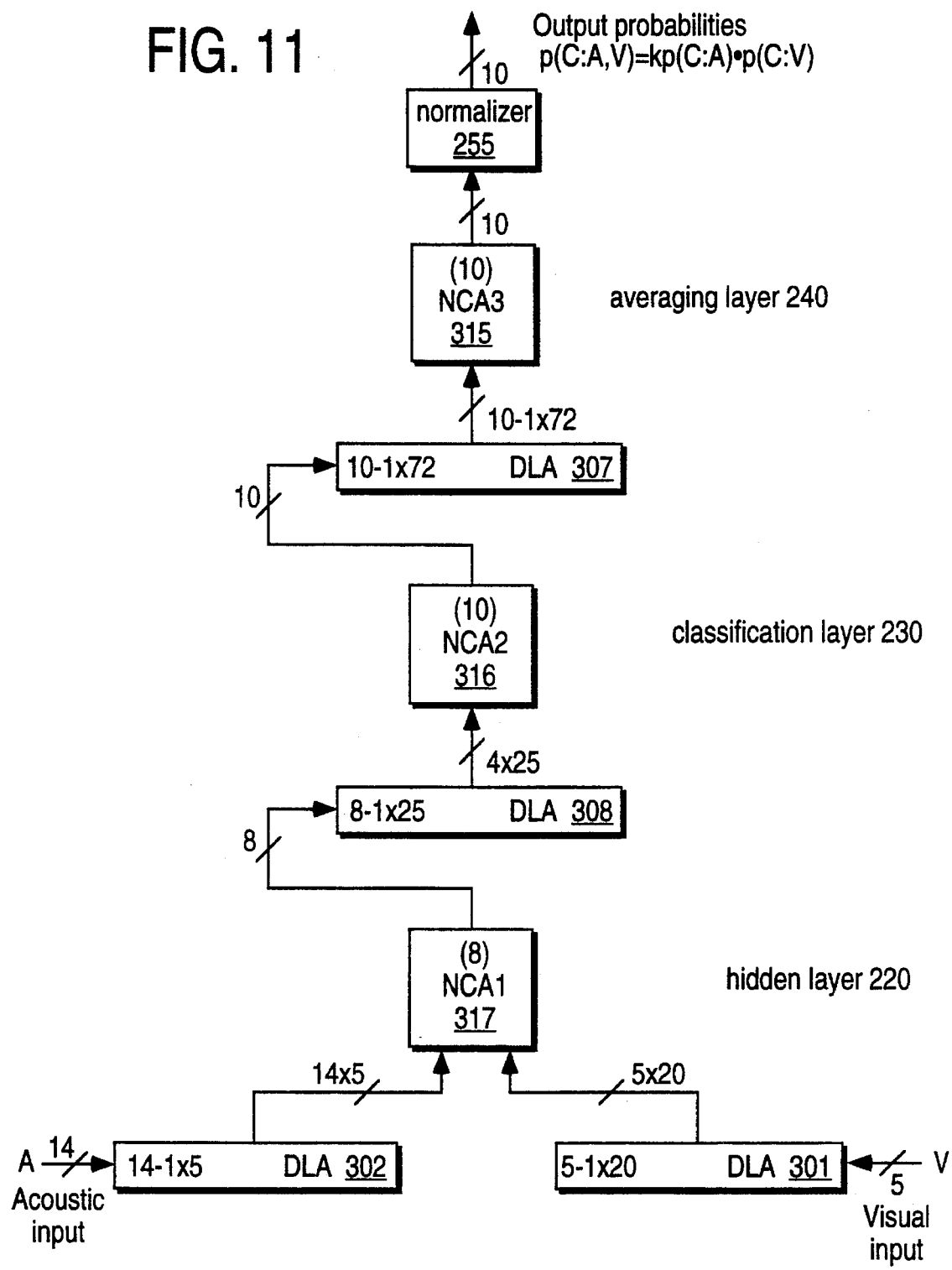
FIG. 11 shows a hardware conserving embodiment of a full AV speech classifier.

FIG. 11 is another evolutionary step in the process of combining the processing of the acoustic and visual data at the earliest level possible. Upon receipt and storage of sufficient input acoustic and video data in DLA 302 and 301, respectively, the formation of cross-terms can occur in hidden layer 220 by having each of the 8 neurons operating on the combined 14×5 and 5×20 data fields available from DLA 302 and 301. The hidden layer output is stored in DLA 308 and passed on through NCA2 313 of classification layer 230. The output is then treated as previously described in FIG. 10.

Figure 12:
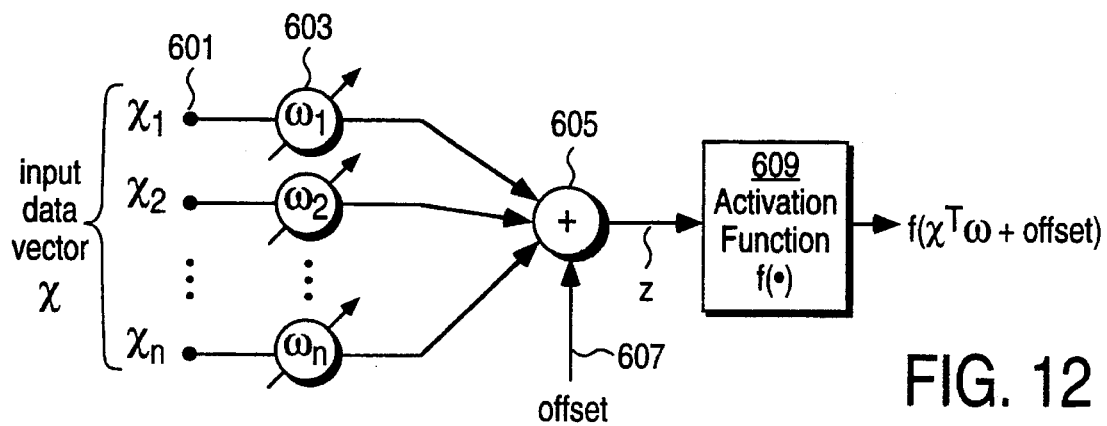
FIG. 12 shows the architecture of a typical McCulloch-Pitts type artificial neuron cell.

In the TDNN structures of FIGS. 7, 9, 10, and 11, two basic types of neuron cells are employed. NCA1 of hidden layer 220 and NCA3 of averaging layer 240 comprise conventional McColluch-Pitts (M-P) type neuron cells as shown in FIG. 12. An input data vector x, provided on input terminals 60 1, is operated on by weighting vector w by use of weight multiplying elements 603. Summing network 605 sums the $x_i w_i$ terms formed by multiplying elements 603 resulting in the vector dot-product, $$z = x^T w = \sum_i x_i \cdot w_i$$

being formed at the output of summer 605. The vector dot-product and offset is applied to activation function unit 609 that forms the output signal $f(z)=f(x^T w + \text{offset})$. An offset value may be provided by input 607 to summer 605.

Figure 13A:
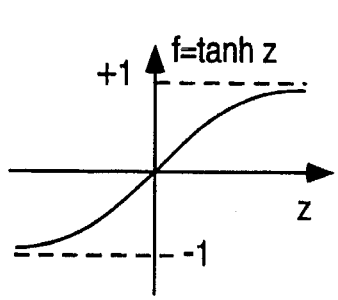
FIGS. 13A and 13b and 13B shows examples of activation function transfer characteristics.
Figure 13B:
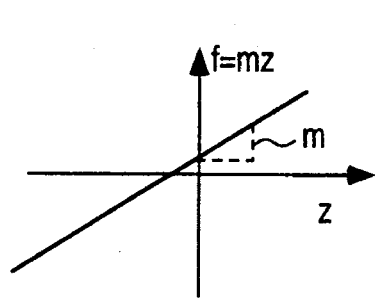

Activation function unit 609 may have one of several types of transfer characteristics, such as those shown in FIG. 13. The transfer characteristic in FIG. 13(a) is, $f(z)=\tanh z$, a hyperbolic tangent function of the input signal, z. This is one example of a large set of semi-linear sigmoidal squashing functions which may be used in NCA1 of the hidden layer. FIG. 13(b) shows a linear transfer function, $f(z)=mz+$ offset. This form of activation function is used in the neuron cells of NCA 3 of averaging layer 240 (with offset equal to zero).

Figure 13C:
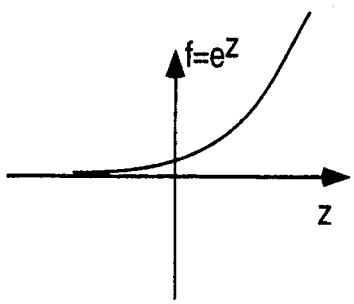

FIG. 13(c) shows an exponential activation function, $f(z)=e^{z/T}$, where T is a positive value "temperature" parameter that effectively varies the base value, $e^{1/T}$, that is exponentiated by input value z. The exponential form of activation function is used to form the estimated probability of a set of unknown variables (the set of allowable utterances) in accordance with *Parallel Distributed Processing: Explorations in the Microstructure of Cognition*, Vol. 1: Foundations, Rumelhart, et al., The MIT Press, Cambridge, Mass., 1986, Chapter 6, pp. 194–281. The exponential activation function is used in the M-P type neuron cells of NCA2 of classification layer 230.

Figure 14:
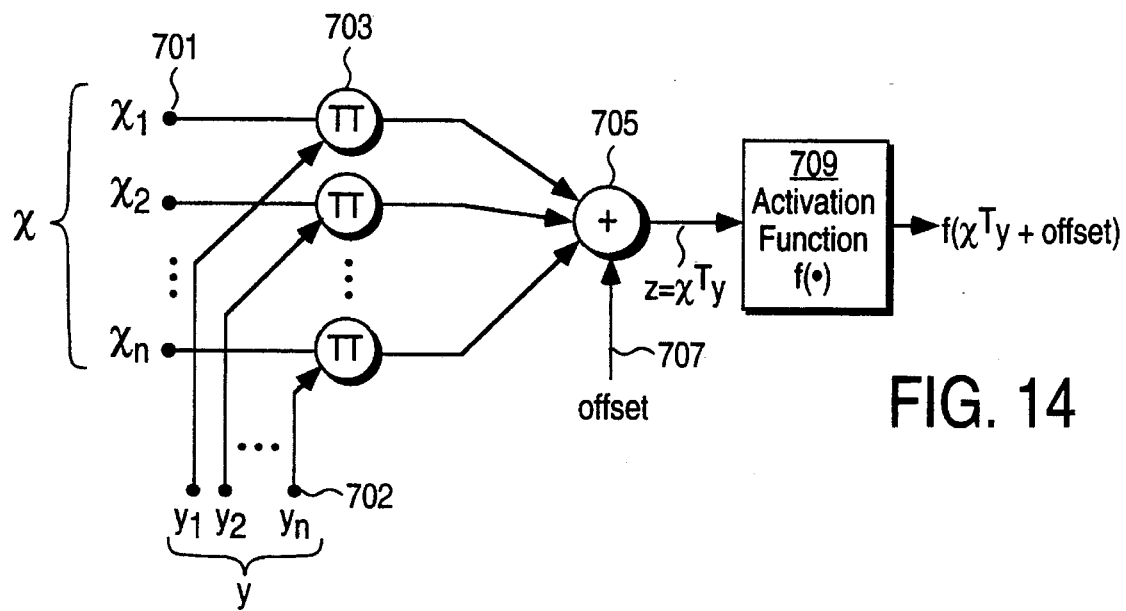
FIG. 14 shows the architecture of a typical sigma-pi ($\Sigma\pi$) artificial neuron cell.

The second type of neuron cells used in NCA4 of the TDNN structure of FIG. 9 is known as a sigma-pi ($\Sigma\pi$) type cell, as shown in FIG. 14. Unlike the M-P cell of FIG. 12 where a single input data vector is applied to a set of controllable weights, $\{w_i\}$, $\Sigma\pi$ neuron cells, in their simplest form, accept two input data vectors, x and y, at input terminals sets 701 and 702, respectively. Corresponding input vector components, $x_i$ and $y_i$, are applied multiplier units 703 to form the $x_i \cdot y_i$ product terms that are summed by summer network 705 together with any offset term supplied on offset input terminal 707. Thus, the output of the summer, $$z = x^T y + \text{offset} = \sum_i x_i \cdot y_i + \text{offset}$$

is the vector dot-product of x and y plus offset which is applied as the input to activation function unit 709 with transfer characteristic, $f(0)$. The $\Sigma\pi$ neuron cell of FIG. 14 is used in the A×V network of FIG. 9 to form the sum of the product of the ten $p(c|A)$ values and the corresponding ten $p(c|V)$ values in NCA4 of averaging layer 240 (offset value equal to zero).

Because of the differentiable activation function units employed in the neuron cells (see FIGS. 12, 13, and 14), a form of the well-known backpropagation algorithm (described by Rumelhart, D. E., et al., in "Learning Internal Representations by Error Propagation," 318–362 (Chapter 8) of *Parallel Distributed Processing*, Vol. 1: Foundations, The MIT Press, Cambridge, Mass., 1960) was used to train the neural network weights. The error function of the output during training was a notable difference from that described in the above reference.

If a neural network's task is to select the class to which an input pattern belongs, if all input patterns belong to one and only one class (a one-out-of-n classification), and if the output of the neural network consists of n values representative of a probability distribution (i.e., sum of values equals one), the error metric for a single training classification attempt is $$\text{error} = -\ln\{\hat{p}(c_1)\}$$

where $c_1$ is the correct classification of the $1^{th}$ class member and $\hat{p}(c_1)$ is the trial value of the output representing the probability that the input data belongs to class $c_1$. Because the true probability of the input utterance being $c_1$ is one (certainty), the above error expression may be re-written as the difference in the logarithms of the true and trial probabilities ($p^{(c_1)}$ and $\hat{p}(c_1)$ respectively), or $$\text{error} = \ln\{p(c_1)\} - \ln\{\hat{p}(c_1)\} = \ln\{p(c_1)/\hat{p}(c_1)\}$$

This error metric involves the ratio of probabilities. Recalling that the probabilities were formed by the exponentiating activation function (FIG. 13(c)), the substitution of $p(c_1)=e^{z_1/T}$ and $\hat{p}(c_1)=e^{\hat{z}_1/T}$ yields $$\text{error} = \ln\{e^{(z_1-\hat{z}_1)/T}\} = (z_1-\hat{z}_1)/T$$

where $z_1$ and $\hat{z}_1$ are, respectively, the correct and trial values of the input z to the $1^{th}$ classification neuron cell activation function network. Thus, the negative logarithm of the trial output probability is a measure of the error generated by the signal arriving at the classification level including the error contributed by the - - - weights of the $1^{th}$ neuron cell of NCA2. Therefore, by using training patterns representative of all utterances to be classified, this logarithmic error function may be used to train the TDNN network.

Experiments were conducted using the systems described for distinguishing between ten spoken letters: B, D, F, M, N, P, S, T, V, and Z. Acoustic and visual information was collected from four male subjects who are native speakers of American English. Each subject spoke each letter five times. One example of the letter P spoken by one subject was rendered unusable by an error in the visual tracking system resulting in a total of 199 rather than 200 tokens. Each token was converted into visual (VO), acoustic (AO) and full acoustic and video (AV) vectors suitable for use in classification layer 230, as previously described.

Four of the five repeated letter utterances for each of the ten letters spoken by the four speakers (160 patterns) were used for training. The remaining 39 containing four examples of each letter with the exception of three for the letter P as noted above were used for testing.

Figure 15A:
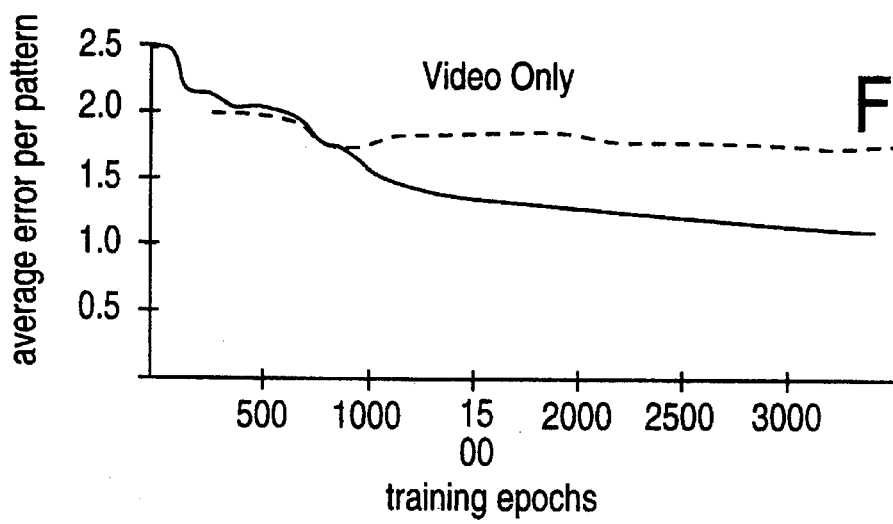
FIGS. 15A, 15B, 15C is a set of learning curves showing the progress of training.
Figure 15B:
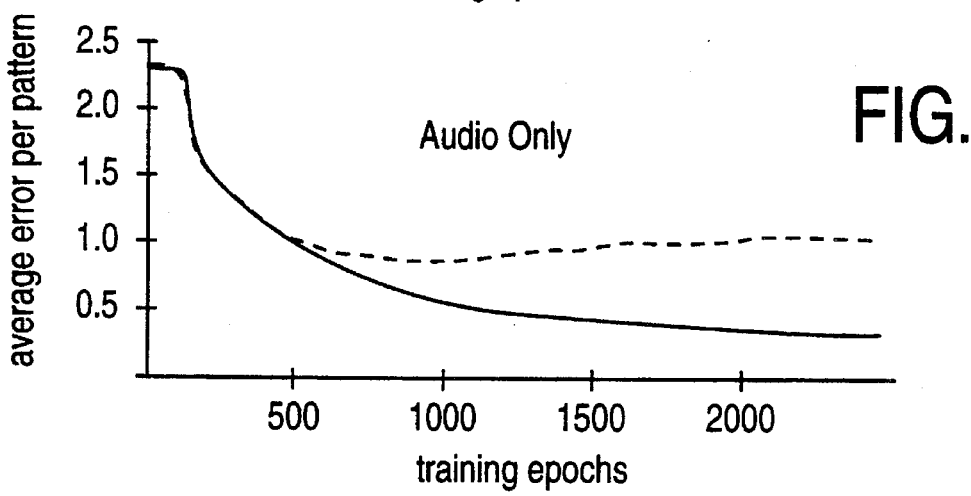
Figure 15C:
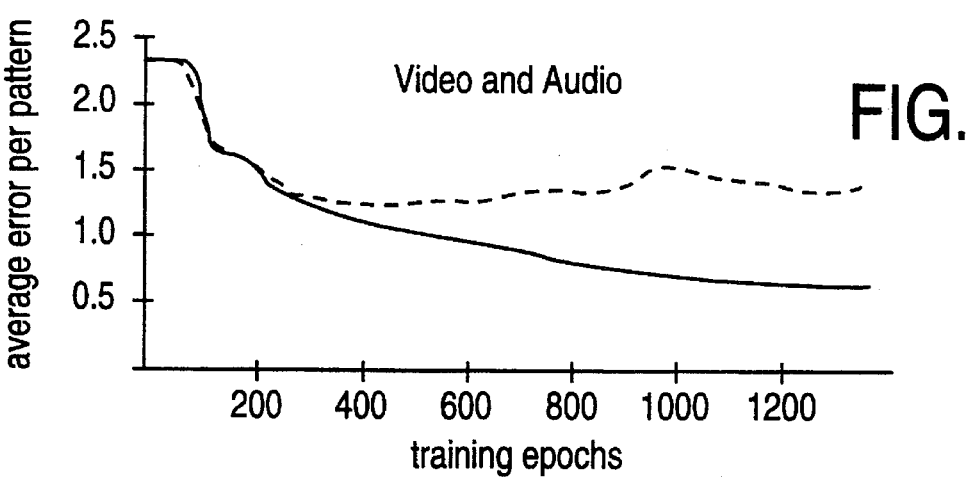
Figure 16A:
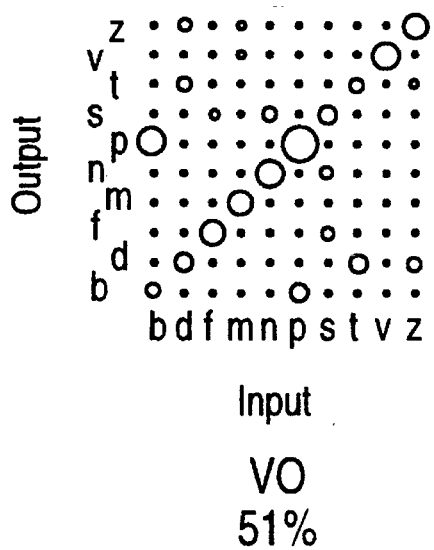
FIGS. 16A, 16B, 16C and 16D shows a set of confusion matrices for four systems.
Figure 16B:
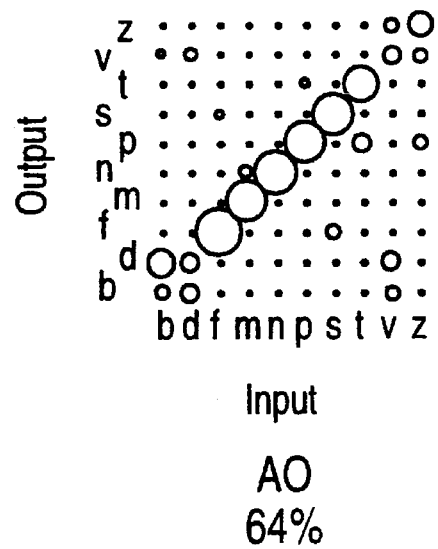
Figure 16C:
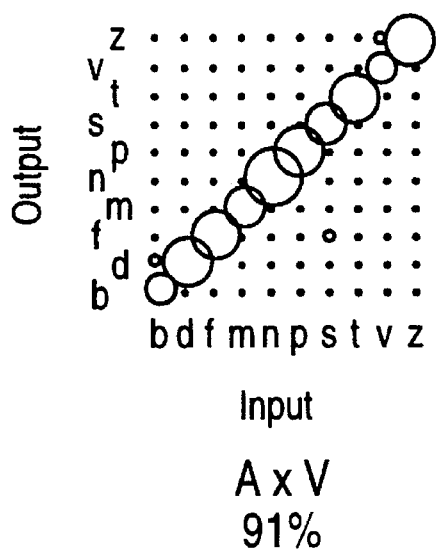
Figure 16D:
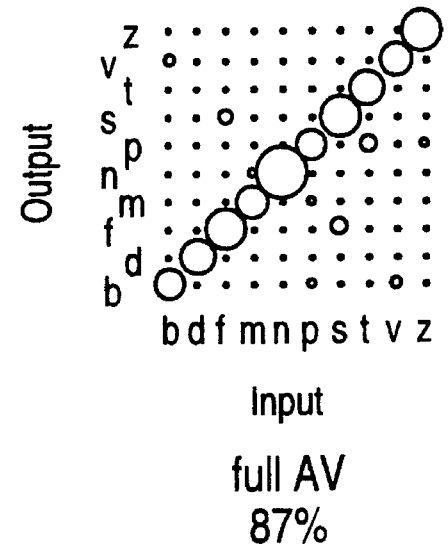

Each of the three networks were trained using the back-propagation algorithm for finding the set of weights causing minimum error for the training set examples. A learning rate constant of $\eta=0.001$ and momentum constant of $\alpha=0.9$ was used for the VO and AO cases while constants of $\eta=0.0002$ and $\alpha=0.9$ were used for the full AV case. The full AV network was constructed by merging the AO and VO trained networks and adding cross-model connections between the hidden A and V layers and the classification layer. Learning was allowed to progress until the training error over the last few hundred training epochs showed negligible change. The software simulation of the spectrum analyzer 24, lip and mouth position vector generator 14, and TDNN speech classifier 200 running on a Sun Sparcstation 2 computer manufactured by Sun Microsystems, Inc. 2550 Garcia Avenue, Mountain View, Calif. 94043-1100. Training took approximately 20 seconds per epoch for the most complicated full A V network and less for the others. At every 50 epochs of training, the weights in the network were recorded and the testing set error was computed. FIG. 15 shows the progression of error reduction as a function of the number of training epochs used for VO, AO, and full AV cases. The dotted line represents the error when using the testing set of input data while the solid line is the error observed when using the training set for testing. As might be expected, the latter set generally produced lower errors.

After the "best" set of weights was established by the training process for each of the three cases, confusion matrices were generated for the testing data. For each letter utterances, the average of the output distributions over all the testing set examples of that letter was computed. FIG. 16 shows the resulting confusion matrices for the VO, AO, and A×V and the full AV networks. Each vertical column is labeled by the spoken letter presented as the input; each horizontal row represents the output letters selected with their associated probabilities indicated by the site of each disk. The percentage number below each confusion matrix is the overall accuracy of that system.

Note the confusion of the /bi/ and /di/ phonemes in the AO network and the unsymmetric confusion of /bi/ and /pi/ in the VO system. Thus, while /pi/ may be easily confused for /bi/ in the VO system, they are readily distinguished in the AO system. Conversely, the VO system readily distinguishes between /bi/ and /di/. Also note the acoustic (AO) similarity of the /em/ and /en/ phonemes that differ primarily in the acoustically subtle feature of nasality and are clearly distinguishable in the VO system. The VO system tends to confuse /di/ and /ti/ but not so for the AO system. The A×V system mostly eliminates these and other confusions as evidenced by the high probability of classification along the main diagonal.

Although it is reasonable to expect that the full AV system with an overall accuracy of 87% should be better than the A×V system with its measured 91% accuracy because the full AV system can learn associations at a lower (hidden layer) level the test results indicate otherwise. This result strongly suggests that the 19 element full AV vector did not accurately maintain synchronism between the acoustic 10 elements and visual 5 element portions of the complete vector because they were processed separately through their respective pre-processors. In the case of the A×V system, synchronism was less critical because the acoustic and visual vectors were processed through separate TDNNs. In other words, low-level correlations in the training patterns might have been altered so that the full AV net could not take advantage of that information.

The relative insensitivity of the A×V system to acoustic noise was demonstrated by a simulation in which pink noise with a standard deviation of 0.4 was added by adding a random variable to each A vector produced by the spectrum analyzer. Under these conditions, the AO network had an overall accuracy of 43% while the A×V network had an accuracy of 74%. This improved accuracy was achieved without adjustment of any free parameters such as modifying the ratio of acoustic to visual evidence.

The performance of speech recognition systems in a noisy environment is an important consideration. More particularly, systems using visual (lip-reading) augmentation are expected to find greatest use in noisy environments such as found, for example, in large offices, crowded rooms, factory floors, and cockpits. Under these conditions standard acoustic speech recognition systems perform poorly.

Current practice in the design and use of adaptive lip-reading systems is limited to training the system in noiseless environments and not in the noisy environment in which the system is to operation. For example, see Yuhas et al., "Neural Network Models of Sensory Integration for Improved Vowel Recognition," Proc. IEEE 78(10), 1988, pp. 1658–1668; and Petajan et al., "Automatic Lip-reading to Enhance Speech Recognition," Proceedings of the IEEE Communications Society Global Telecommunications Conference, Nov. 26–29, 1984, Atlanta, Ga.

A crucial point, apparently not appreciated in current practice, is the visual counterpart of the Lombard effect (Lombard, E., "Le Signe de le Elevation de la Voix," Ann. Malad. l'Orielle. Larynx. Nex. Pharynx 37, 19 11, pp. 101–119). Lombard showed that if a talker is in an acoustically noisy environment, the sound of the speech differs from that generated in a quiet environment. For example, the duration of many acoustic features change (typically lengthen) and the amplitude of the sound increases when the speaker changes from a quiet environment to a noisy one.

Recently conducted experiments have shown that the visual features of the talker also change in noisy environments. For example, the magnitude of the lip separation during the ulterance /oh/ is larger in noisy environments, and the nose-to-jaw separation during the ulterance of /awl/ is also larger. This behavior is analogous to the hyperarticulation effects in acoustical speech recognition systems and to the Lombard effect.

Consequently, an improved method of training lipreading systems that takes account of this discovery of the visual counterpart of the Lombard effect is described below and in FIG. 17.

Figure 17:
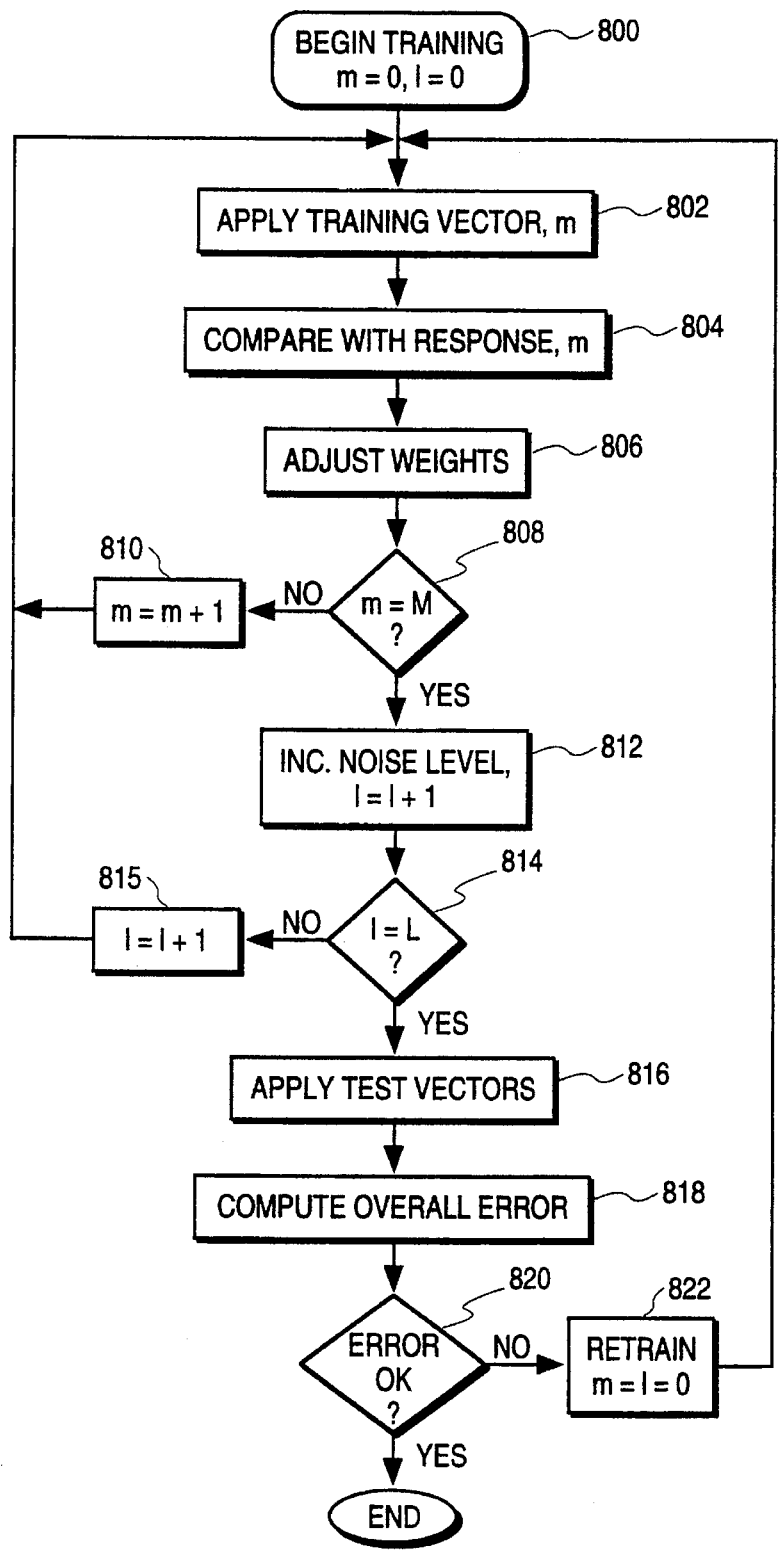
FIG. 17 is a training procedure flow diagram.

The training method flow diagram of FIG. 17 begins at step 800 where it is assumed that a set of M training input vectors and corresponding exemplar output vectors are available. The training vector index, m, and noise level index, 1, are both set to zero. The synaptic weights of the TDNN speech classifier are initialized by a set of random weights if the TDNN classifier is totally untrained, or by a set of partially trained weights. Also, the ambient noise level is set at an initial, 1=0, level. The $m^{th}$ training vector is applied to the TDNN classifier in step 802 and the resulting response is compared with the corresponding $m^{th}$ output exemplar vector in step 804 and an error metric is generated. Consequently, the synaptic weights are adjusted in step 806 by use of a known learning algorithm such as the well known back-propagation algorithm or generalized delta rule as described in "Parallel Distributed Processing," Rumelhart et al., The MIT Press, Cambridge, Mass., 1986, Vol. 1, Ch.. 8, pp. 322–328. Step 808 checks if all of the M training vectors have been used and, if not, returns to step 802 for another iteration. When all M training vectors have been used, m=M, the method moves on to step 812 where this noise level is changed to level, 1=1+1. Step 814 checks to see if all L noise levels have been used and, if not, returns to step 802 for another set of M iterations at the new noise level, 1. If 1=L, all planned training noise levels have been used and the process moves on to step 816 where a set of test vectors are applied to the TDNN speech recognition system. The response to the test vectors is compared with the desired response in step 818 and an overall error metric is computed. If the error metric is acceptable, test step 820 ends the process. Otherwise, the process moves to step 822 where retraining procedures are invoked which may include generating a new set of training vectors, reordering the original set of training vectors, using the original training vector set, changing the order in which different noise levels are applied, or simply rerunning the same training process by initializing the indices (m, 1=0) and returning to step 802 for a whole new iteration.

Other possible variations of the above outline procedure will become apparent to those versed in the art such as, applying test vectors after test step 808, and then retraining if required.

Figure 18:
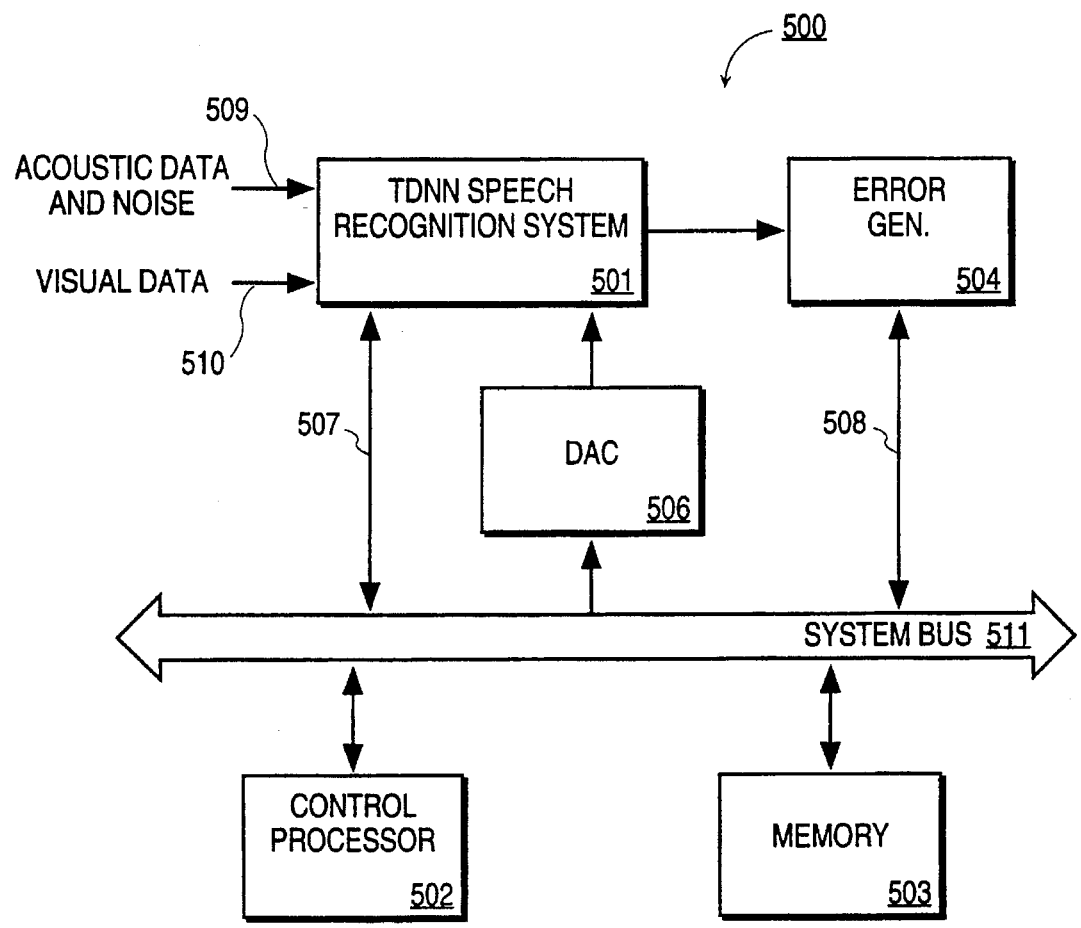
FIG. 18 is a functional block diagram of a training system.

FIG. 18 is a functional block diagram for a training system 500 employing a TDNN speech classifying system 501 as shown in FIG. 1. System 500 is capable of accepting acoustic training data with ambient environmental noise on input 509, and visual training data on input 510. It should be noted that visual data may also be impaired by visual noise such as smoke, fog or dust. An alternate set of digital input training data also be supplied from memory 503 via system bus 511. In that case, digital-to-analog converter (DA) system 506 may be used to convert prestored audio and visual data vectors into analog values suitable for entry into TDNN speech classifier 200 of system 501. The output of speech classifier 200 corresponds to the response of system 501 to the input training data. The system 501 output is compared with the desired response in error generator 504, which contains an analog to digital converter (ADC) for converting the output vector of system 501 with a quantized exemplar response vector provided from memory 503 via connecting lines 508. The actual error metric may be computed in control processor 502 using a simple difference vector generated by error generator 504. Control processor 502 provides the necessary control and initialization of system 500, as well as support for computations such as overall error after training. ADC 506 and the ADC of error generation 504 may not be necessary if quantized visual and acoustic data vectors are acceptable by TDNN classifier 200 and classifier 200 produces a quantized output vector.

In the preceding description, numerous specific details are set forth, such as a specific number of utterances, data samples, devices, etc., in order to provide a thorough understanding of the embodiments. It will be obvious, however, to one skilled in the an that the present invention may be practiced without these specific details. In other instances, well-known circuits have not been shown in detail, or have been shown in block diagram form only, in order to avoid unnecessarily obscuring the present invention.

What is claimed is:

1. A training system for a speech recognition system comprising:
   (a) a speech recognition system for recognizing utterances belonging to a pre-established set of allowable candidate utterances using acoustic speech signals and selected concomitant dynamic visual facial feature motion between selected facial features associated with acoustic speech generation, comprising,
      (i) an acoustic feature extraction apparatus for converting signals representative of dynamic acoustic speech into a corresponding dynamic acoustic feature vector set of signals,
      (ii) a dynamic visual feature extraction apparatus for converting signals representative of the selected concomitant dynamic facial feature motion associated with acoustic speech generation into a corresponding dynamic visual feature vector set of signals, and
      (iii) a time delay neural network classifying apparatus with an input-to-output transfer characteristic controlled by a set of adjustable synaptic weights for generating an output response vector representing a conditional probability distribution of the allowable candidate speech utterances by accepting and operating on a set of corresponding time-delayed dynamic acoustic and visual feature vector pairs that are respectively supplied by the acoustic and visual feature extraction apparatus to a set of inputs; and
   (b) a control system comprising a control processor and an associated memory coupled to the speech recognition system for initializing parameters, for controlling the speech recognition system, for storing acoustic and visual output exemplar vectors, for computing output errors, and for adjusting the time delay neural network classifying apparatus synaptic weights based on the computed errors in accordance with a prescribed training procedure.

2. The system of claim 1 wherein the time delay neural network classifying apparatus comprises:
   (a) a tapped delay line input layer for accepting a sequence of corresponding paired acoustic and visual time-varying feature vectors and for producing a multiplicity of sequential acoustic and visual feature vectors, in parallel, at the delay line output taps;
   (b) a hidden layer of neural cells coupled to the output taps of the tapped delay line for producing enhanced time dependent features at the hidden layer output;
   (c) a classification layer of neural cells, coupled to the output of the hidden layer of neural cells, for generating a set of output time-varying signals at the classification layer output, each classifying layer output time-varying signal representative of a probability of a corresponding utterance being present; and
   (d) an averaging layer apparatus, connected to the outputs of the classification layer, for generating a set of time averaged varying outputs, one for each allowable utterance type, representative of a conditional probability that the associated utterance was spoken.

3. The system of claim 1 wherein the time delay neural network classifying apparatus accepts quantized dynamic acoustic and visual training vectors from the control system.

4. The system of claim 1 wherein the neural network classifying apparatus accepts analog dynamic acoustic and visual feature training vectors from the control system, further comprising means for converting quantized dynamic acoustic and visual feature training vectors from the control processor memory into analog training vectors.

5. The system of claim 1 wherein the time delay neural network classifying apparatus has a quantized output.

6. The system of claim 1 further comprising an error generator coupled to and controlled by the control processor and coupled to the output of the time delay neural network classifying apparatus, for accepting an output response vector generated by a visual and an acoustic input training vector, for comparing an exemplar output vector to the output response vector and producing a comparison result, outputting the comparison result to the control processor for use in adjusting the time delay neural network synaptic weights.

7. A method for training a speech recognition system for recognizing utterances belonging to a pre-established set of allowable candidate utterances using acoustic speech signals and selected concomitant dynamic visual facial feature motion between selected facial features associated with acoustic speech generation, the speech recognition system comprising an acoustic feature extraction apparatus for converting signals representative of dynamic acoustic speech into a corresponding dynamic acoustic feature vector set of signals, a dynamic visual feature extraction apparatus for converting signals representative of the selected concomitant dynamic facial feature motion associated with acoustic speech generation into a corresponding dynamic visual feature vector set of signals, a time delay neural network classifying apparatus with an input-to-output transfer characteristic controlled by a set of adjustable synaptic weights for generating an output response vector representing a conditional probability distribution of the allowable candidate speech utterances by accepting and operating on a set of corresponding time-delayed dynamic acoustic and visual feature vector pairs that are respectively supplied to a set of inputs by the acoustic and visual feature extraction apparatus, and a control system for controlling the speech recognition system, for storing dynamic visual and dynamic acoustic feature training vectors, for applying the feature training vectors to the time delay neural network classifying apparatus and computing output errors, and for adjusting the time delay neural network classifying apparatus synaptic weights based on the computed output errors, the method comprising:

(a) initializing the time delay neural network classification apparatus synaptic weights;

(b) applying a corresponding pair of dynamic acoustic and a visual feature training vectors to the set of inputs of the time delay neural network classification apparatus and generating an output response vector;

(c) comparing the output response vector with an exemplar output response vector stored in the control system associated memory corresponding to the training vectors applied to the neural network classifier and producing an error measure; and (d) adjusting the time delay neural network classifying apparatus synaptic weights in accordance with a prescribed algorithm.

8. The method of claim 7 wherein the acoustic and visual feature training vectors each have a prescribed level of noise.

9. The method of claim 7 wherein step (b) the pair of acoustic and visual feature training vectors have a different prescribed level of noise each time steps (b) through (d) are repeated.

10. The method of claim 9 further comprising the step of generating the acoustic and visual feature training vectors by processing a noisy acoustic speech utterance together with a concomitant visual speech signal through a separate acoustic and a separate dynamic visual feature extraction apparatus.

* * * * *